United States Patent
Arakawa

(10) Patent No.: US 10,817,559 B2
(45) Date of Patent: Oct. 27, 2020

(54) IMAGE PROCESSING APPARATUS WITH DOCUMENT SIMILARITY PROCESSING, AND IMAGE PROCESSING METHOD AND STORAGE MEDIUM THEREFOR

(71) Applicant: CANON KABUSHIKI KAISHA, Tokyo (JP)

(72) Inventor: Junya Arakawa, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 16/122,624

(22) Filed: Sep. 5, 2018

(65) Prior Publication Data

US 2019/0087444 A1   Mar. 21, 2019

(30) Foreign Application Priority Data

Sep. 21, 2017 (JP) ................ 2017-181695

(51) Int. Cl.

| | | |
|---|---|---|
| G06K 9/00 | (2006.01) | |
| G06F 16/583 | (2019.01) | |
| H04N 1/407 | (2006.01) | |
| G06T 1/00 | (2006.01) | |
| H04N 1/00 | (2006.01) | |
| H04N 1/40 | (2006.01) | |
| G06F 40/174 | (2020.01) | |

(52) U.S. Cl.
CPC .......... *G06F 16/583* (2019.01); *G06F 40/174* (2020.01); *G06T 1/0007* (2013.01); *H04N 1/00949* (2013.01); *H04N 1/40062* (2013.01); *H04N 1/4072* (2013.01); *H04N 1/4074* (2013.01)

(58) Field of Classification Search
CPC .. G06K 9/6407; G06K 9/2009; G06K 9/6423; H04N 1/4074; H04N 1/00949; G06T 1/0007; G06T 1/7001; G06F 17/30247; G06F 17/30249; G06F 16/583
See application file for complete search history.

(56) References Cited

U.S. PATENT DOCUMENTS

| | | | |
|---|---|---|---|
| 7,593,961 B2 | 9/2009 | Eguchi et al. | ............. 707/104.1 |
| 7,639,893 B2 * | 12/2009 | Duan | ..................... G06T 5/007 |
| | | | 345/589 |
| 8,320,019 B2 | 11/2012 | Namikata et al. | ............. 358/2.1 |

(Continued)

FOREIGN PATENT DOCUMENTS

| | | |
|---|---|---|
| JP | 2004-348706 | 12/2004 |
| JP | 2011-015348 | 1/2011 |

*Primary Examiner* — Amir Alavi
(74) *Attorney, Agent, or Firm* — Venable LLP

(57) ABSTRACT

To make it possible to search for a document of the same kind as that of a document relating to a scanned image both highly accurately and simply. An image processing apparatus including: a calculation unit configured to calculate a degree of similarity between an input document image and each of a plurality of document images by repeatedly performing calculation of a degree of similarity while changing each range including a specific area, which is a calculation target of a degree of similarity, in the input document image and the plurality of document images; and a determination unit configured to determine a document image whose calculated degree of similarity is the highest of the plurality of document images as a document image that matches with the input document image.

15 Claims, 22 Drawing Sheets

(56) References Cited

U.S. PATENT DOCUMENTS

| | | | |
|---|---|---|---|
| 8,331,653 B2* | 12/2012 | Seki .......................... | G06T 7/74 382/103 |
| 8,548,226 B2* | 10/2013 | Sakano ................... | G06T 7/593 382/104 |
| 8,582,890 B2* | 11/2013 | Liba ........................ | G06T 5/003 382/199 |
| 8,730,548 B2 | 5/2014 | Tani et al. ..................... | 358/539 |
| 8,817,104 B2* | 8/2014 | Kakita ............... | G06K 9/00711 348/161 |
| 8,958,609 B2* | 2/2015 | Yasukawa ................. | G06T 7/33 382/118 |
| 10,062,007 B2* | 8/2018 | Nagato ................... | G06N 3/126 |
| 10,528,542 B2* | 1/2020 | Banerjee ................ | G06T 1/0007 |
| 2009/0123075 A1* | 5/2009 | Yamazaki ................ | G06K 9/00 382/198 |
| 2019/0087444 A1* | 3/2019 | Arakawa ............ | H04N 1/00949 |

\* cited by examiner

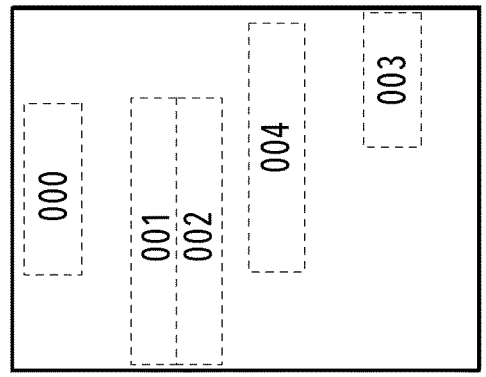
FIG.4A / FIG.4D
QUERY IMAGE — ID9400
Bill
COMMODITY A:¥4,000
COMMODITY B:¥5,000
TOTAL:¥9,000
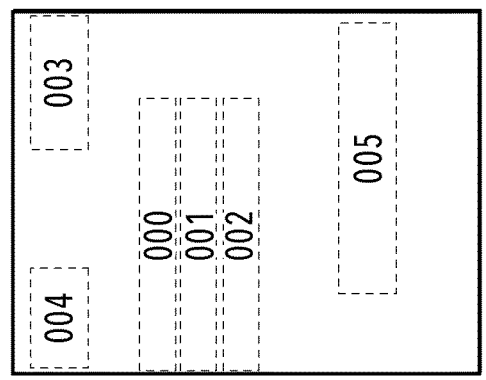
FIG.4B / FIG.4E
REGISTERED IMAGE_1 — ID9631
Bill
COMMODITY C:¥6,000
COMMODITY D:¥7,000
COMMODITY D:¥8,000
TOTAL:¥21,000
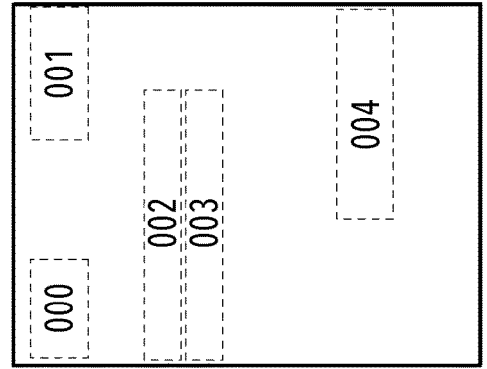
FIG.4C / FIG.4F
REGISTERED IMAGE_2
ORDER SHEET
COMMODITY A:¥4,000
COMMODITY B:¥5,000
TOTAL:¥9,000
ID9400

500

SCAN ASSIST

| FILE NAME | ORDER SHEET _ TOKYO SHOKAI INC. | 502

504  ORDER SHEET  503

TOKYO SHOKAI INC.
WE ORDER AS FOLLOWS.
APPOINTED DATE OF DELIVERY:
  OCTOBER 25, 2015

NOVEMBER 1, 2015

ORDER NO. 123456 987

501

| NO. | QUANTITY | UNIT PRICE | AMOUNT | REMARKS |
|---|---|---|---|---|
| MATERIAL NAME 1 | 10 | 500 | 5,000 | |
| MATERIAL NAME 2 | 100 | 11,000 | 1,100,000 | |
| MATERIAL NAME 1 | 200 | 500 | 100,000 | |
| MATERIAL NAME 3 | 10 | 10,000 | 100,000 | |
| MATERIAL NAME 4 | 20 | 13,000 | 260,000 | |
| MATERIAL NAME 5 | 50 | 14,000 | 700,000 | |
| MATERIAL NAME 8 | 20 | 17,000 | 340,000 | |
| MATERIAL NAME 9 | 30 | 18,000 | 540,000 | |
| MATERIAL NAME 11 | 40 | 20,000 | 800,000 | |
| MATERIAL NAME 12 | 10 | 21,000 | 210,000 | |
| MATERIAL NAME 15 | 30 | 24,000 | 720,000 | |

CANCEL        505        OK

| | | NUMBER OF PAIRS MADE BY TEXT BLOCK OF QUERY IMAGE WITH TEXT BLOCK OF ANOTHER REGISTERED IMAGE IN PAIR OF BLOCKS OF INTEREST | | | | | |
|---|---|---|---|---|---|---|---|
| | | 0 | 1 | 2 | 3 | 4 | 5 OR MORE |
| NUMBER OF PAIRS MADE BY TEXT BLOCK OF REGISTERED IMAGE WITH TEXT BLOCK OF ANOTHER QUERY IMAGE IN PAIR OF BLOCKS OF INTEREST | 0 | 1.00 | 0.75 | 0.67 | 0.63 | 0.60 | 0.58 |
| | 1 | 0.75 | 0.50 | 0.42 | 0.38 | 0.35 | 0.33 |
| | 2 | 0.67 | 0.42 | 0.33 | 0.29 | 0.27 | 0.25 |
| | 3 | 0.63 | 0.38 | 0.29 | 0.25 | 0.23 | 0.21 |
| | 4 | 0.60 | 0.35 | 0.27 | 0.23 | 0.20 | 0.18 |
| | 5 OR MORE | 0.58 | 0.33 | 0.25 | 0.21 | 0.18 | 0.17 |

FIG.10

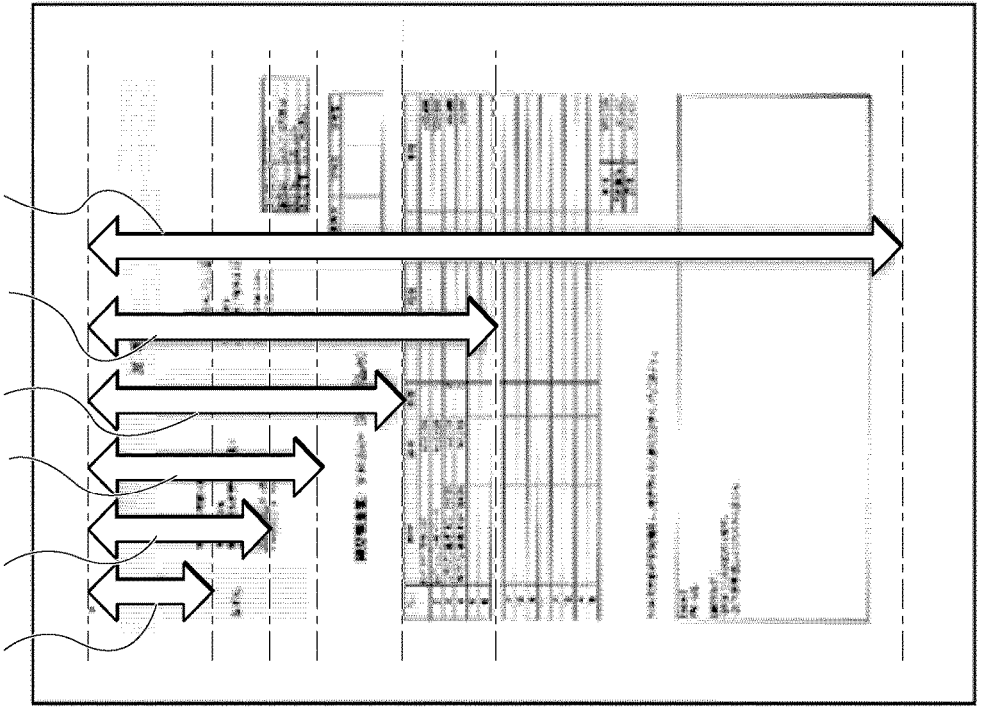
FIG.16A REGISTERED IMAGE
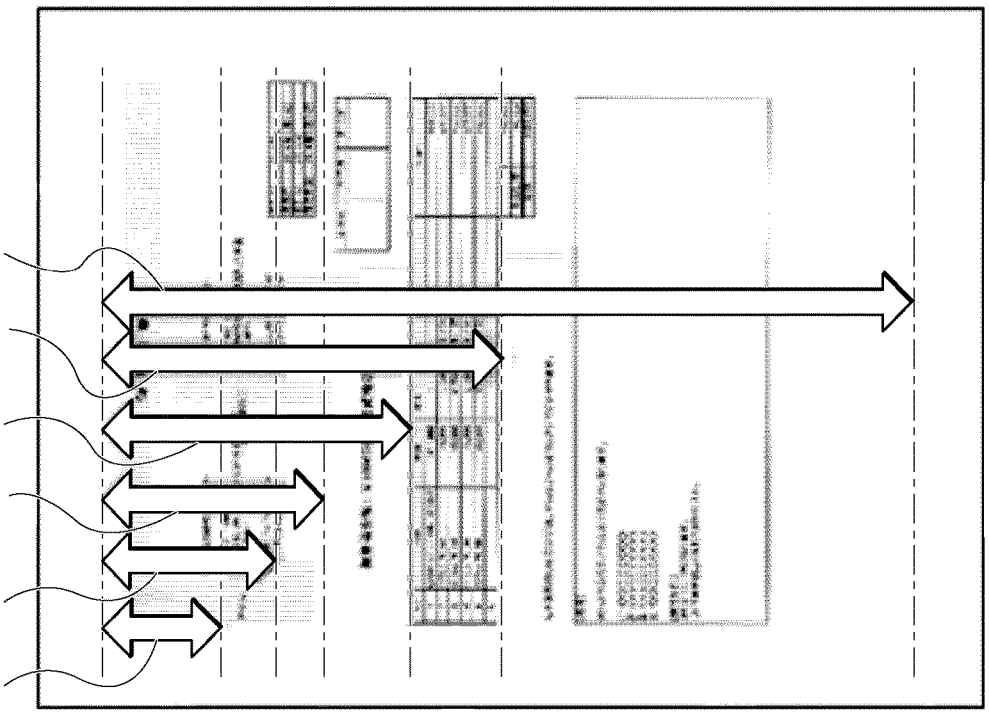
FIG.16B QUERY IMAGE

STATEMENT OF DELIVERY

TO: P INC.

¥120,000 TAX INCLUDED

SLIP No. S04

FEBRUARY 18, 2017
K INC.

000-1234
A34-56-78, M CITY, T PREFECTURE
TEL:00-2522-1234

PERSON IN CHARGE SEAL

WE DELIVER AS FOLLOWS.

| No. | ITEM | QUANTITY | UN | UNIT PRICE | AMOUNT | REMARKS |
|---|---|---|---|---|---|---|
| S0401 | NORMAL BOARD A | 5 | 個 | 1,000 | 10,000 | |
| S0402 | PLASTER BOARD A | 5 | 個 | 1,000 | 10,000 | |

| SUB TOTAL | 20,000 |
|---|---|
| CONSUMPTION TAX | 0 |
| TOTAL | 20,000 |

NOTE  THIS STATEMENT IS TO CERTIFY THE DATE OF DELIVERY OF THE ABOVE COMMODITY, NOT RECEIPT OF MONEY.

PAYEE OF MONEY
 K BRANCH OF M BANK
ACCOUNT TYPE
 ORDINARY ACCOUNT·CURRENT ACCOUNT
ACCOUNT NUMBER
 412333
ACCOUNT NAME
 FOR DELIVERY S04

REGISTERED IMAGE

| STATEMENT OF DELIVERY | | | | | | | |
|---|---|---|---|---|---|---|---|
| TO: N INC. | | | | | SLIP No. A01 | | |
| ¥150,000 TAX INCLUDED | | | | | FEBRUARY 16, 2017 M INC. 000-1234 S3-5-6, M CITY, T PREFECTURE TEL:00-3633-4455 | | PERSON IN CHARGE SEAL |
| WE DELIVER AS FOLLOWS. | | | | | | | |
| NO. | ITEM | QUANTITY | UN | | UNIT PRICE | AMOUNT | REMARKS |
| A01 | BOARD Z1 | 10 | 個 | | 1,000 | 10,000 | |
| A02 | BOARD Z2 | 10 | 個 | | 1,000 | 10,000 | |
| A03 | BOARD Z3 | 10 | 個 | | 1,000 | 10,000 | |
| A04 | BOARD Z4 | 10 | 個 | | 1,000 | 10,000 | |
| A05 | BOARD Z5 | 10 | 個 | | 1,000 | 10,000 | |
| A06 | SHEATHING | 10 | 個 | | 1,000 | 10,000 | |
| A07 | BOARD Z6 | 10 | 個 | | 1,000 | 10,000 | |
| A08 | BOARD Z7 | 10 | 個 | | 1,000 | 10,000 | |
| A09 | BOARD L1 | 10 | 個 | | 1,000 | 10,000 | |
| A10 | BOARD L2 | 10 | 個 | | 1,000 | 10,000 | |
| A11 | BOARD M2 | 10 | 個 | | 1,000 | 10,000 | |
| A12 | BOARD P1 | 10 | 個 | | 1,000 | 10,000 | |
| A13 | BOARD D1 | 10 | 個 | | 1,000 | 10,000 | |
| A14 | BOARD D2 | 10 | 個 | | 1,000 | 10,000 | |
| A15 | BOARD D3 | 10 | 個 | | 1,000 | 10,000 | |
| A16 | BOARD EQ1 | 10 | 台 | | 10,000 | 100,000 | |
| A17 | BOARD EQ2 | 10 | 台 | | 10,000 | 100,000 | |
| A18 | BOARD EQ3 | 10 | 台 | | 10,000 | 100,000 | |
| A30 | HEATING EQUIPMENT | 10 | 式 | | 30,000 | 300,000 | |

| | SUB TOTAL | 750,000 |
|---|---|---|
| | CONSUMPTION TAX | 0 |
| | TOTAL | 750,000 |

NOTE　THIS STATEMENT IS TO CERTIFY
　　　THE DATE OF DELIVERY OF THE ABOVE
　　　COMMODITY, NOT RECEIPT OF MONEY.

PAYEE OF MONEY
　　　K BRANCH OF S BANK
ACCOUNT TYPE
　　　ORDINARY ACCOUNT·CURRENT ACCOUNT
ACCOUNT NUMBER
　　　325612
ACCOUNT NAME
　　　FOR DELIVERY A 1703 (bracket encompassing the NOTE and payee section)

QUERY IMAGE

FIG.17B

QUERY IMAGE

FIG.18A

REGISTERED IMAGE

FIG.18B

REGISTERED IMAGE

ORDER SHEET   NOVEMBER 1, 2015   —2005

TOKYO SHOKAI INC.
WE ORDER AS FOLLOWS.          ORDER NO.   123456 987   —2003
DELIVERY DATE OCTOBER 25, 2015

| No. | QUANTITY | UNIT PRICE | AMOUNT | REMARKS |
|---|---|---|---|---|
| MATERIAL NAME 1 | 10 | 500 | 5,000 | |
| MATERIAL NAME 2 | 100 | 11,000 | 1100,000 | |
| MATERIAL NAME 1 | 200 | 500 | 100,000 | |
| MATERIAL NAME 3 | 10 | 10,000 | 100,000 | |
| MATERIAL NAME 4 | 20 | 13,000 | 260,000 | |
| MATERIAL NAME 5 | 50 | 14,000 | 700,000 | |
| MATERIAL NAME 8 | 20 | 17,000 | 340,000 | |
| MATERIAL NAME 9 | 30 | 18,000 | 540,000 | |
| MATERIAL NAME 11 | 40 | 20,000 | 800,000 | |
| MATERIAL NAME 12 | 10 | 21,000 | 210,000 | |
| MATERIAL NAME 15 | 30 | 24,000 | 720,000 | |
| | | | | |
| | | | | |
| | | | | |
| | | | | |
| | | | | |
| | | | | |
| | | | | |
| TOTAL AMOUNT (CONSUMPTION TAX INCLUDED) | | | 4,875,000 | |

| ISSUER | CHECKER |
|---|---|
| | |

111-1111  T123-1, T CITY, I PREFECTURE

T INC.
REPRESENTATIVE DIRECTOR TARO IBARAKI
TEL:1111-11-1111  FAX:1111-11-1112

FIG.20A

ORDER SHEET

NOVEMBER 1, 2015

TOKYO SHOKAI INC.

WE ORDER AS FOLLOWS.  ORDER NO.   123456 987
DELIVERY DATE OCTOBER 25, 2015

| No. | QUANTITY | UNIT PRICE | AMOUNT | REMARKS |
|---|---|---|---|---|
| MATERIAL NAME 1 | 10 | 500 | 5,000 | |
| MATERIAL NAME 2 | 100 | 11,000 | 1100,000 | |
| MATERIAL NAME 1 | 200 | 500 | 100,000 | |
| MATERIAL NAME 3 | 10 | 10,000 | 100,000 | |
| MATERIAL NAME 4 | 20 | 13,000 | 260,000 | |
| MATERIAL NAME 5 | 50 | 14,000 | 700,000 | |
| MATERIAL NAME 8 | 20 | 17,000 | 340,000 | |
| MATERIAL NAME 9 | 30 | 18,000 | 540,000 | |
| MATERIAL NAME 11 | 40 | 20,000 | 800,000 | |
| MATERIAL NAME 12 | 10 | 21,000 | 210,000 | |
| MATERIAL NAME 15 | 30 | 24,000 | 720,000 | |
| | | | | |
| | | | | |
| | | | | |
| | | | | |
| | | | | |
| | | | | |
| | | | | |
| | | | | |
| TOTAL AMOUNT (CONSUMPTION TAX INCLUDED) | | | 4,875,000 | |

| ISSUER | CHECKER |
|---|---|
| | |

111-1111 T123-1, T CITY, I PREFECTURE
T INC.
REPRESENTATIVE DIRECTOR TARO IBARAKI
TEL:1111-11-1111  FAX:1111-11-1112

FIG.20B

IMAGE PROCESSING APPARATUS WITH DOCUMENT SIMILARITY PROCESSING, AND IMAGE PROCESSING METHOD AND STORAGE MEDIUM THEREFOR

BACKGROUND OF THE INVENTION

Field of the Invention

The present invention relates to a search technique of a document image.

Description of the Related Art

Conventionally, there exists a business flow that performs document management and the like by image data by scanning a paper document of a business form and the like, such as an estimation sheet and an order sheet, by an image reading device and generating digital data of the paper document. Generally, data of an image (scanned image) obtained by scanning a document, such as a business form, is stored in a predetermined folder with a file name and meta information in accordance with the kind and contents of the business form and the like being attached. Here, it requires time and effort of a user to manually create a file name and meta information, specify a folder that is a storage destination (transmission destination), and create a new folder. In particular, in the case where the input work such as this is performed by a software keyboard displayed on a touch panel in an MFP and the like, the load becomes heavier. For the problem such as this, there exists a technique called a scan assist for reducing the load of the input work of a user. As one that discloses the scan assist, for example, there is Japanese Patent Laid-Open No. 2011-15348. In Japanese Patent Laid-Open No. 2011-15348, first, the kind of document and a rule for various settings, such as the file name setting, meta information setting, and storage destination setting, are associated with each other and registered in advance. Then, in the case where a target document is scanned, the kind of document is specified from the scanned image and character string information created by making use of the setting rule registered in advance in association with the various kinds of document is recommended to a user as a candidate of a file name, meta information, or a storage destination.

In the method of Japanese Patent Laid-Open No. 2011-15348 described above, it is necessary to specify which of a plurality of kinds of document image (registered image) registered in advance, a scanned image of a business form or the like resembles. Regarding this point, for example, there is a method in which a degree of similarity between a scanned image and a registered image is found and the document image is specified based on the degree of similarity. In this case, on a condition that whether both the scanned image and the document image are the "same" document image is determined, it is sufficient to perform a comparison by finding the degrees of similarity of the entire images. However, in order to determine whether both are the "same kind" of document image, it is necessary to find the degree of similarity by focusing attention on the features possessed by the documents, on which the determination is based. Here, the "same kind" means that the main structures of the documents match although the contents of the character strings within the documents are different. The main structure refers to, for example, the basic layout of a document title, an item, and so on, described at the upper portion of the document and in the case where the main structures match, it is possible to regard the documents as being the same kind of document even though details do not match. Regarding this point, for example, Japanese Patent Laid-Open No. 2004-348706 has disclosed a search technique of an original electronic document, which takes into consideration that there may be a difference in part of documents, specifically, a method of performing a search by finding a degree of similarity with a registered image for each divided area within a scanned image and by weighting the obtained degree of similarity.

In almost all cases, documents that can be regarded as being the same kind are created in the same format. Consequently, in the case of generating a file name and the like of a scanned image for the same kind of document, a possibility that a user applies a common rule is strong. However, in the case where whether documents are the same kind of document is determined, normally, the portion of the document, to which importance should be attached, differs for each kind of document, and further, it is not rare that specific arrangement of each component differs even though the original format is the same. In this situation, it is not possible for the technique of Japanese Patent Laid-Open No. 2004-348706 described above to sufficiently deal with such a case. Further, it is difficult to fix in advance the target portion of determination of degree of similarity in a partial area within the document and in the case where a user is caused to specify one by one, much time and effort are required at the time of processing a large number of business forms and the like, and therefore, the load of a user is heavy.

Consequently, an object of the present invention is to make it possible to search for the same kind of document as a document relating to a scanned image both highly accurately and simply.

SUMMARY OF THE INVENTION

The image processing apparatus according to the present invention is an image processing apparatus including: a processor; and a memory for storing a computer executable program, and the processor executes the computer executable program to perform: calculating to calculate a degree of similarity between an input document image and each of a plurality of document images by repeatedly performing calculation of a degree of similarity while changing each range including a specific area, which is a calculation target of a degree of similarity, in the input document image and the plurality of document images; and determining to determine a document image whose calculated degree of similarity is the highest of the plurality of document images as a document image that matches with the input document image.

Further features of the present invention will become apparent from the following description of exemplary embodiments with reference to the attached drawings.

BRIEF DESCRIPTION OF THE DRAWINGS

FIG. 4A to FIG. 4F are diagrams explaining an outline of matching processing;

FIG. 5 is a diagram showing an example of a UI screen that presents scan assist information;

FIG. 6A to FIG. 6C are diagrams explaining the way of thinking of a similar document image;

FIG. 10 is a diagram showing an example of a table at the time of setting a weight in accordance with the overlap state of a pair of blocks;

FIG. 16A and FIG. 16B are diagrams showing the way the calculation range of a temporary degree of similarity changes sequentially;

FIG. 17A and FIG. 17B are diagrams explaining an influence of a change in the calculation range of a temporary degree of similarity;

FIG. 18A to FIG. 18C are diagrams explaining correction of a degree of similarity;

FIG. 20A and FIG. 20B are diagrams showing a specific example of a predetermined area that is registered in association with a registered image.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
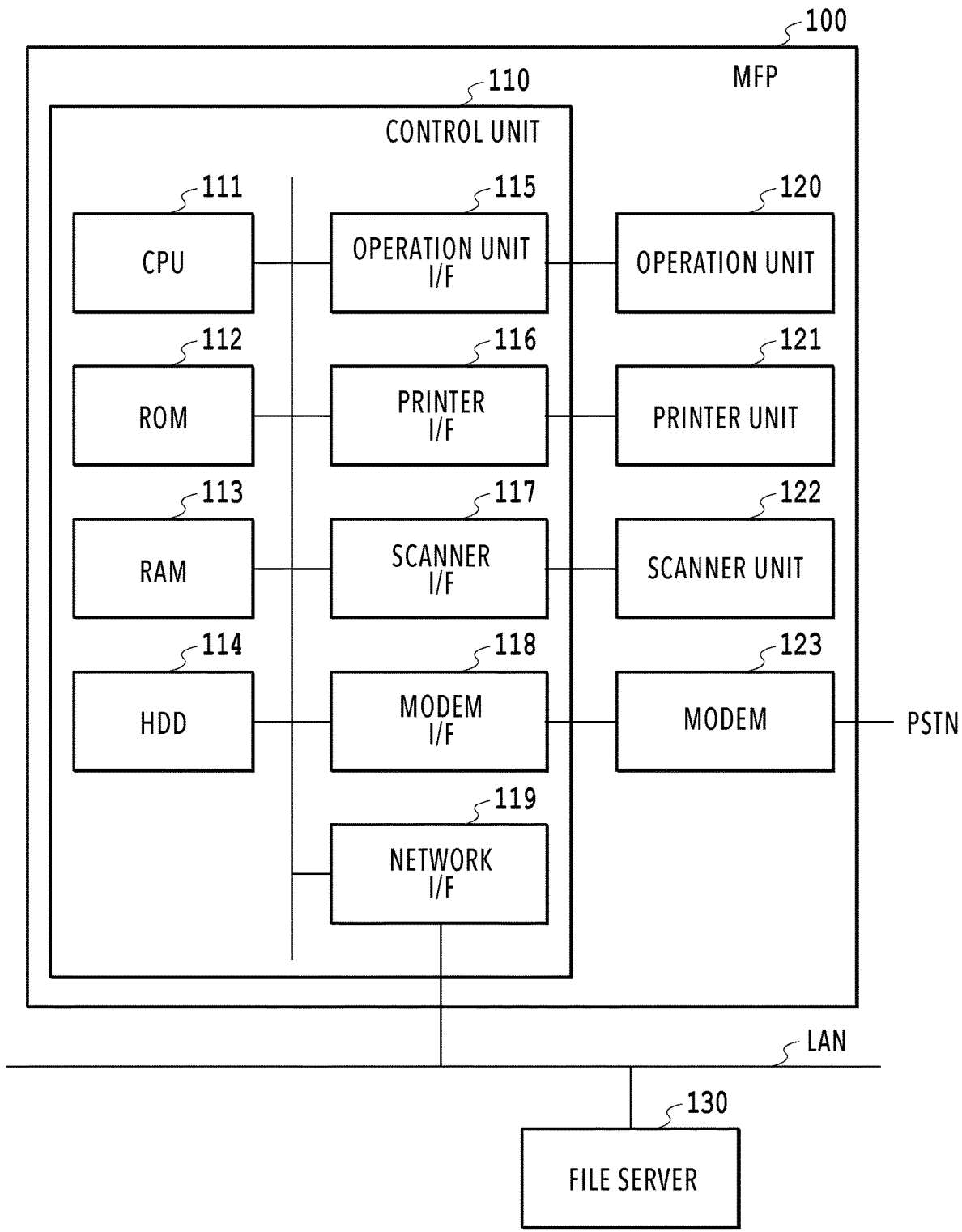
FIG. 1 is a hardware configuration diagram of an MFP.

FIG. 1 is a hardware configuration diagram of an MFP 100 as an image processing apparatus according to the present embodiment. The MFP 100 includes a control unit 110, an operation unit 120, a printer unit 121, a scanner unit 122, and a modem 123. The control unit 100 includes each of units 111 to 119 in the following and controls the operation of the entire MFP 100. The CPU 111 reads control programs stored in the ROM 112 and performs and controls various functions including a scan assist. The RAM 113 is used as a temporary storage area, such as a main memory and a work area, of the CPU 111. In the present embodiment, the one CPU 111 performs each piece of processing shown in a flowchart, to be described later, by using one memory (RAM 113 or HDD 114), but this is not limited. For example, it may also be possible to cause a plurality of CPUs or a plurality of RAMs or HDDs to perform each piece of processing in cooperation with one another. The HDD 114 is a large-capacity storage unit configured to store image data and various programs. The operation unit I/F 115 is an interface that connects the operation unit 120 and the control unit 110. The operation unit 120 includes a touch panel, a keyboard, and so on and receives an operation, an input, and instructions by a user. The printer I/F 116 is an interface that connects the printer unit 121 and the control unit 110. Image data for printing is transferred from the control unit 110 to the printer unit 121 via the printer I/F 116 and printed on a printing medium, such as paper. The scanner I/F 117 is an interface that connects the scanner unit 122 and the control unit 110. The scanner unit 122 scans a document, such as a business form, set on a document table or ADF (Auto Document Feeder), not shown schematically, and generates a document image and inputs the document image to the control unit 110 via the scanner I/F 117. It is possible for the MFP 100 to perform file transmission or mail transmission, in addition to printing and outputting (copying) of the data of a document image generated in the scanner unit 122 from the printer unit 121. The modem I/F 118 is an interface that connects the modem 123 and the control unit 110. The modem 123 performs facsimile communication of data of a document image with a facsimile device on the PSTN. The network I/F 119 is an interface that connects the control unit 110 (MFP 100) to a LAN. The MPF 100 transmits data of a document image to a file server 130 on a LAN, receives various kinds of information, and so on by using the network I/F 119. The hardware configuration of the MFP 100 as the image processing apparatus explained above is an example and the MFP 100 may include another configuration as needed or does not need to include part of the configuration.

(Scan Assist Function)

The scan assist function possessed by the MFP 100 is explained. The control unit 110 loads data of a document image read by the scanner unit 122 onto the RAM 113 and analyzes the data and generates information recommended to a user as a scan assist, that is, character string information that is a candidate of the file name or folder path of the document image. The analysis of a document image includes three pieces of processing. The first processing is text block extraction processing to extract a mass that is estimated and recognized as one continuous character string (text block) within the document image. The second processing is optical character recognition processing (hereinafter, OCR processing) to extract character string information from the extracted text block. The third processing is matching processing to find a degree of similarity between a registered document image and a document image scanned newly.

The control unit 110 generates a UI screen for the scan assist and displays the UI screen on the touch panel 110 of the operation unit 120. Then, the control unit 110 performs the above-described analysis processing based on user instructions input via the UI screen, transmission processing of document image data based on the analysis results, and so on.

Figure 2:
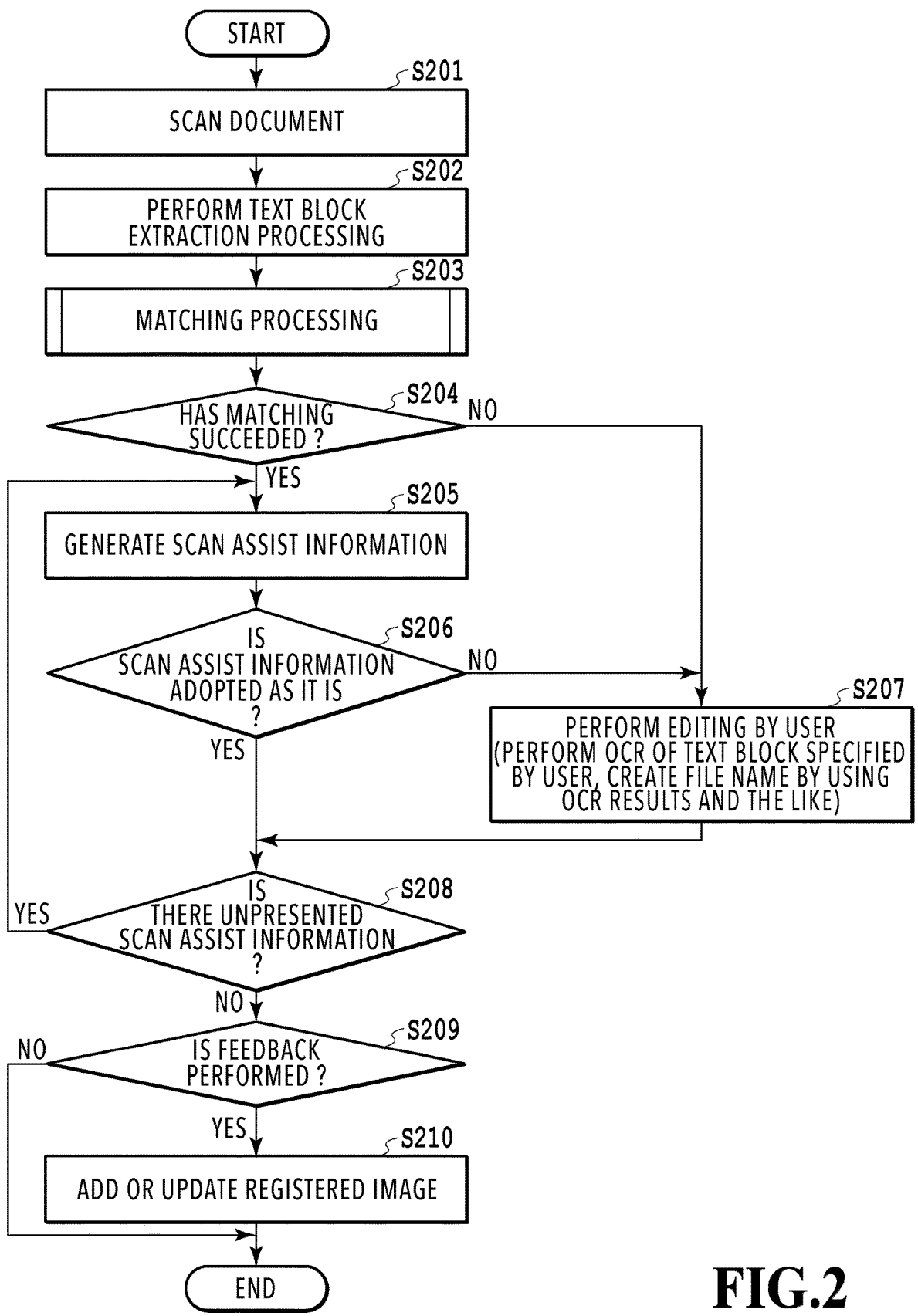
FIG. 2 is a flowchart showing a flow of scan assist processing.

Next, following the above, the operation control of the scan assist function in the MFP 100 is explained. FIG. 2 is a flowchart showing a flow of control in scan assist processing. This series of processing is implemented by the CPU 111 executing a control program stored in the HDD 1114 in the control unit 110. In the following, detailed explanation is given.

In the case where user instructions to scan a document are received via the operation unit 120, the scanner unit 122 performs a scan of the document and generates a document image at step 201. The document image thus generated is compared with a document image group registered in a database as an input document image in matching processing, to be described later. In the following, the search-target input document image generated at this step is called a "query image" and the document image registered in the database is called a "registered image".

At step 202 that follows, the above-described text block extraction processing (area division processing) is performed for the generated query image. Specifically, first, preprocessing, such as binarization of an image signal, correction of an inclination of an image shifted at the time of scan, and rotation into the direction in which the image becomes upright, is performed and the state is corrected into a state where it is easier to perform the text block extraction processing. Then, the query image is divided into blocks in units of objects by performing edge extraction and the like for the corrected query image and a block having the text attribute is specified from the blocks. In more detail, a block having the text attribute is specified as follows.

Figure 3B:
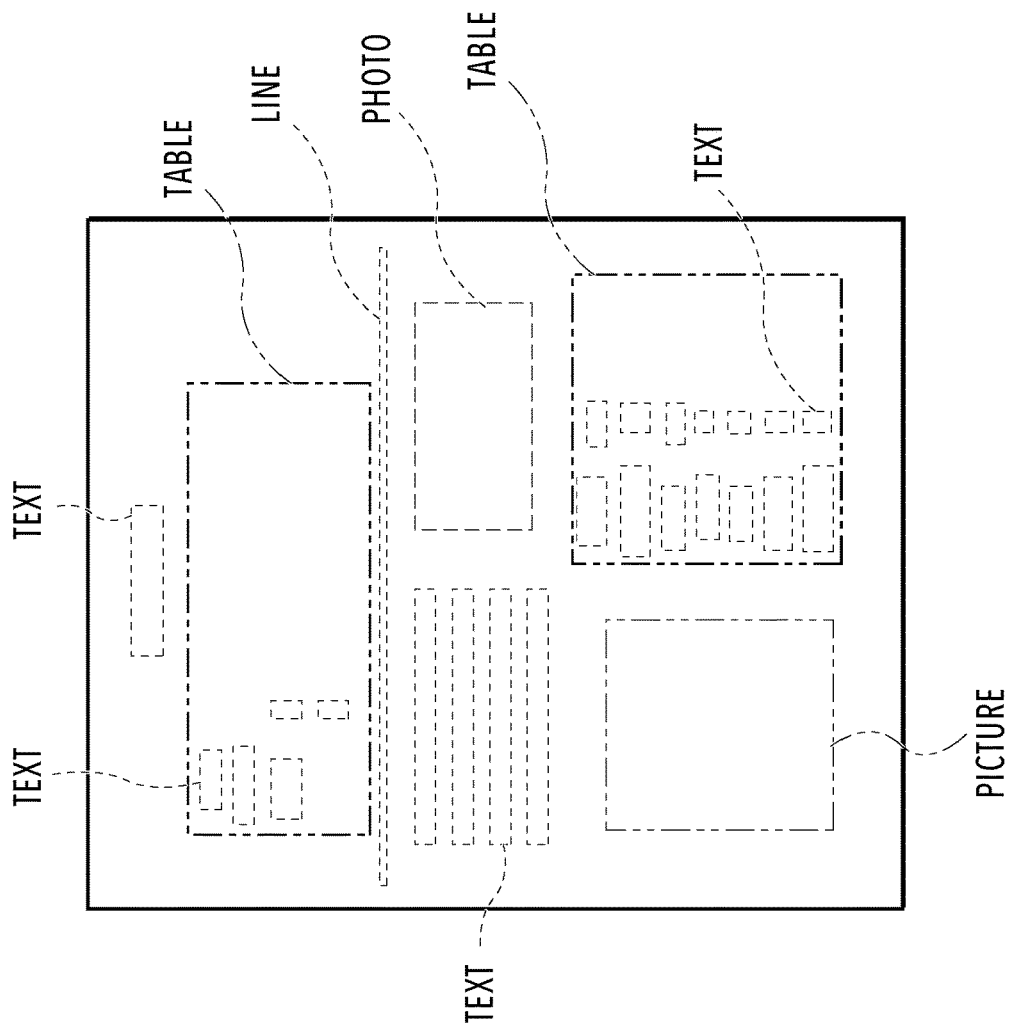
FIG. 3A and FIG. 3B are diagrams showing an example of results of area division processing.
Figure 3A:
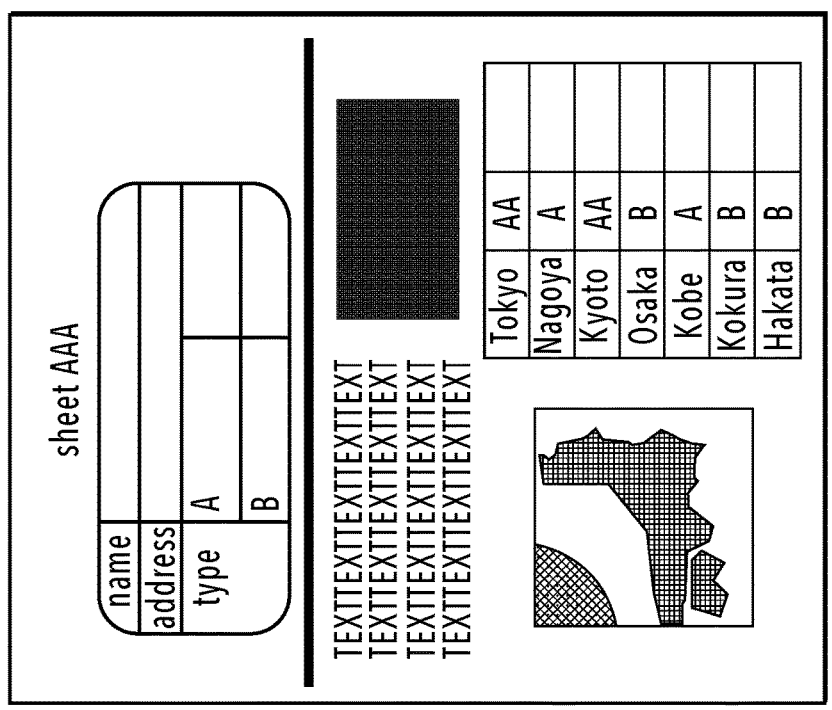

First, by performing contour line tracking for the query image binarized into white and black, a mass of pixels surrounded by a black pixel contour is extracted. Then, for a mass of black pixels whose area is larger than a predetermined area, the contour line tracking is performed also for the white pixels located inside thereof and a mass of white pixels is extracted and further, a mass of black pixels is extracted recursively from the inside of the mass of white pixels whose area is larger than or equal to a predetermined area. The mass of black pixels thus obtained are classified according to size and shape and classified into areas having different attributes. For example, a mass whose aspect ratio is close to 1 and whose size is within a predetermined range is taken to be a mass of pixels corresponding to a character. Further, a portion in which characters adjacent to one another can be grouped in alignment is taken to be a character area (TEXT). A flat mass of pixels is taken to be a line area (LINE). A range occupied by a mass of black pixels including in alignment a rectangular mass of white pixels whose size is larger than or equal to a predetermined size is taken to be a table area (TABLE). An area in which masses of pixels indefinite in shape are scattered is taken to be a photo area (PHOTO). Then, an arbitrarily-shaped mass of pixels other than those described above is taken to be a picture area (PICTURE). From those divided into areas for each attribute of an object, a block determined to have the character attribute is specified as a text block. FIG. 3A and FIG. 3B are diagrams showing an example of results of the area division processing. FIG. 3A shows a query image and FIG. 3B shows results of dividing the query image into blocks in units of objects. The query image is divided into the above-described five kinds of block: TEXT, PICTURE, PHOTO, LINE, and TABLE. The information on each text block obtained at this step (information indicating attribute and position of each block) is used in OCR processing, calculation of degree of similarity, to be described, and so on. The reason only the text block is extracted at this step is that the position of a character string well represents the structure of a document image and closely relates with scan assist information. Consequently, utilization of information on a block determined to have another attribute, such as a photo area and a table area, in subsequent processing is not excluded.

Next, at step 203, matching processing to determine a registered image that is the most similar to the query image from a plurality of registered images stored in the HDD 114 as a registered image database (hereinafter, registered image DB) is performed. In the registered image DB, document images processed in the past, which are registered by addition or updating processing at step 210, to be described later, are registered. Here, an outline of the matching processing is explained with reference to FIG. 4A to FIG. 4F. FIG. 4A shows a query image and FIG. 4B and FIG. 4C show registered images (registered image_1 and registered image_2) different from each other. Here, the query image have many portions whose contents and arrangement of a character string match with those of the registered image_1, but have less portions whose contents and arrangement of a character string match with those of the registered image_2. That is, the degree of similarity between the query image and the registered image_1 is higher than the degree of similarity between the query image and the registered image_2. Because of this, in the example in FIG. 4A to FIG. 4F, the registered image_1 in FIG. 4B is selected as a registered image that matches with the query image (degree of similarity is high).

Here, an outline of estimation of degree of similarity using a text block is also explained. In FIG. 4D, the text block extracted from the query image in FIG. 4A is indicated by a dotted-line rectangle. The dotted-line rectangle indicates each text block and a three-digit number within the rectangle is a number for uniquely identifying each text block. Similarly, in FIG. 4E, the text block extracted from the registered image_1 in FIG. 4B is indicated by a dotted-line rectangle and in FIG. 4F, the text block extracted from the registered image_2 in FIG. 4C is indicated similarly by a dotted-line rectangle. The estimation of degree of similarity using a text block is performed by focusing attention on how the shape and arrangement of a text block resemble. Here, a comparison between the shape and arrangement of the text block in the query image and those of the text block in the registered image_1 indicates that there are many text blocks that match with each other. That is, the shapes and arrangement of 000, 001, 002, and 003 of the query image are the same as those of 004, 003, 000, and 001 in the registered image_1. In contrast to this, in the case of the registered image_2, there exist some text blocks whose shapes and arrangement somewhat resemble each other, but there exist no text blocks whose shapes and arrangement match with each other. In this manner, the degree of similarity is found by focusing attention on the shape and arrangement of a text block. Details of the degree of similarity estimation processing using a text block will be described later. In the results of the matching processing, the ID information for identifying the registered image, the degree of similarity in the registered image whose degree of matching of the shape and arrangement of the text block with those of the query image is high, the setting rule in the registered image, the information on correspondence with the query image, and so on are included. As described previously, the setting rule is information specifying which place where a character string is located within the document image (for example, specified by x-coordinate and y-coordinated) is made use of for what (for example, file name or folder path). The information on correspondence with the query image is information indicating to which text block of the query image, the text block used actually for creation of a file name and the like in the registered image corresponds. Explanation is given by using the example in FIG. 4A and FIG. 4B described above. Here, in the registered image_1, it is assumed that the text block (004) corresponding to the character string "Bill" and the text block (003) corresponding to the character string "ID9631" are the text blocks made use of for creation of a file name. In this case, to the text block of 004, the text block (000) of the character string "Bill" in the query image corresponds. Information that associates the two blocks in a relationship of correspondence like this is one piece of correspondence information. Similarly, to the text block of 003, the text block (001) of the character string "ID9400" corresponds, and therefore, information that associates both the blocks is also one piece of correspondence information. Explanation is returned to the flow in FIG. 2.

At step 204, whether the matching processing has succeeded is determined. Specifically, threshold value processing to determine whether the highest degree of similarity obtained by the matching processing exceeds a predetermined threshold value is performed and in the case where the highest degree of similarity is higher than the threshold value, it is determined that the matching processing has succeeded. In the case where the results of the determination indicate that the matching processing has succeeded (the highest degree of similarity is higher than the predetermined threshold value), the processing advances to step 205. On the other hand, in the case where the matching processing has failed (the highest degree of similarity is lower than or equal to the predetermined threshold value), the processing advances to step 207.

At step 205, based on the matching processing results obtained at step 203, scan assist information is generated and displayed on the UI screen. In detail, first, by using the information on correspondence with the query, which is included in the matching processing results, OCR processing is performed by taking only the specific text blocks within the query image as a target, which correspond to the text blocks of the character strings actually made use of in the matched registered image. Then, in accordance with the setting rule included in the matching processing results, the results (character string information) obtained by the OCR processing are displayed on the touch panel as scan assist information, together with the query image. For example, in the case where the OCR processing results are used for creation of a file name in the matched registered image, the file name created by using the character string information obtained by the OCR processing for the query image is displayed as scan assist information on the query image. Further, in the case where the OCR processing results are used for creation of a folder path in the matched registered image, the folder path created by using the character string information obtained by the OCR processing for the query image is displayed as scan assist information on the query image. By taking only the specific text blocks based on the correspondence information as the target of the OCR processing, it is possible to perform the processing at a speed higher than that in the case where the OCR processing is performed for all the text blocks within the query image, and therefore, the time taken for response to a user is reduced and improvement in usability will result. Further, only the limited portions are taken to be the target, and therefore, the calculation resource is saved.

Here, a specific example of a UI screen on which scan assist information is displayed is shown. FIG. 5 is an example of a UI screen on which the character string information that is candidates of the file name is presented to a user as scan assist information. On a UI screen 500, each text block within a query image 501 is highlighted in gray. There is a portion that is not highlighted although the portion is a character string portion and this indicates that the portion is not recognized as a text block. Here, in a text box 502, a character string of "Order sheet_Tokyo Shokai Inc." using the results of performing the OCR processing for the text blocks 501 and 502 based on the matched registered image is displayed as a file name candidate. That is, the OCR processing results of the two text blocks based on the information on correspondence with the query image, which is included in the matching processing results, that is, "Order sheet" and "Tokyo Shokai Inc." are linked by an underscore (under bar) "_" as a delimiter and recommended as a file name candidate. In the case where a user presses down an OK button 505 in this state, as the file name of the query image 501, the contents of a group of character strings displayed in the text box 502 are determined. In the case where a user does not adopt the recommended file name candidate, it is made possible to edit the recommended file name to an arbitrary character string by pressing down the text box 502.

At step 206, whether the scan assist information presented at step 205 is adopted as it is determined. In the example in FIG. 5, in the case where the scan assist information is not edited on the UI screen 500 and the OK button 505 is pressed down as it is (in the case where the scan assist information is adopted as it is), the processing advances to step 208. On the other hand, in the case where the text box 502 is pressed down, the processing advances to step 207 and the mode moves into the editing mode.

At step 207, the direct setting of a file name and the like (in the case of No at step 204) or editing of the scan assist information (in the case of No at step 206) is performed by a user. Specifically, the OCR processing is performed for the text block specified by a user on the UI screen 500 and a file name or the like is created by using the OCR results.

At step 208, whether there is unpresented scan assist information is determined. In the case where there is unpresented scan assist information, the processing returns to step 205 and the next scan assist information is presented. For example, in the case where the OCR processing results are made use of for not only the file name but also the folder path in the matched registered image, following the presentation of the file name candidate, the folder path candidate is presented. On the other hand, in the case where there is no unpresented scan assist information, the processing advances to step 209.

At step 209, whether feedback processing for the subsequent scan assist processing is performed is determined. In the case where the scan assist information generated at step 205 is adopted as it is (Yes at step 206), it is determined that the feedback processing is not necessary and this processing is terminated. On the other hand, in the case where a user directly sets a file name and the like at step 207 or performs editing without adopting the generated scan assist information, it is determined that the feedback processing is necessary and the processing advances to step 210.

At step 210, the feedback processing is performed. For example, in the case where the matched registered image is not correct, the query image processed this time and the OCR processing results used for creation of the file name and the like are associated with each other and registered as a new registered image. Further, in the case where the matched registered image is correct, but the setting rule is changed, the contents of the matched registered image are updated by taking the contents after the change as a new setting rule. By adding or updating the registered image as described above, it is possible to improve the accuracy of scan assist information presented to a user at the time of execution of the next and subsequent scan assist function.

The above is the contents of the control in the scan assist processing.

(Matching Processing)

Figures 6A, 6B, 6C:
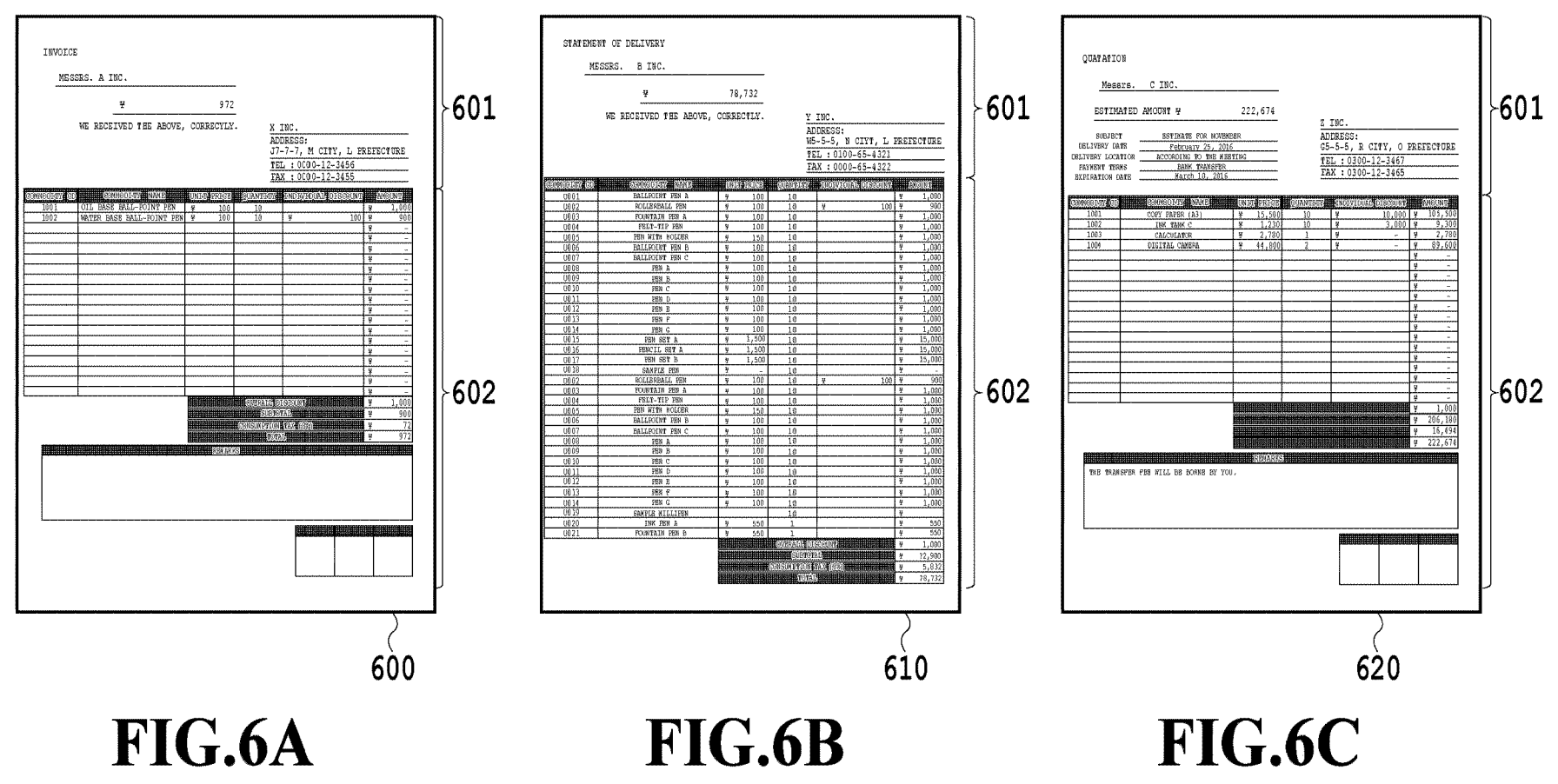
Figure 7:
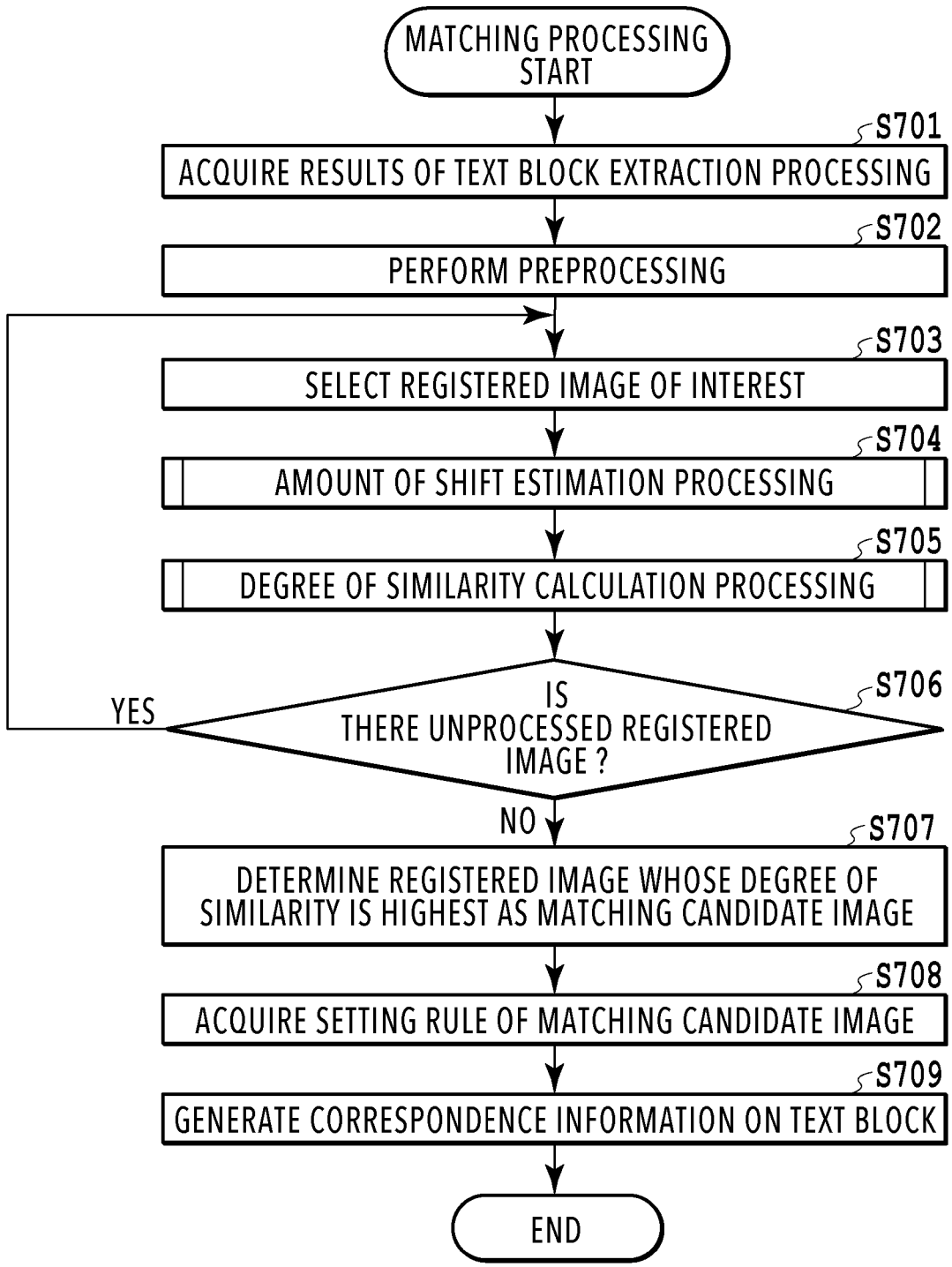
FIG. 7 is a flowchart showing a flow of matching processing.

Next, the matching processing, which is a feature of the present embodiment, is explained in detail. Before describing details of the matching processing, the registered image that is desired to be matched in this processing, that is, the document that is desired to be regarded as being the same kind as the document of the query image is explained. This matching processing aims at generation of scan assist information. Because of this, the basic way of thinking is that in the case where areas having a strong possibility of being made use of for generation of scan assist information resemble each other between document images, the documents are regarded as being the same kind of document and a high degree of similarity is set. An example of a specific document image is explained. Each of FIG. 6A to FIG. 6C shows a document image obtained by scanning a different document. Here, a document image 600 in FIG. 6A and a document image 610 in FIG. 6B resemble each other in an upper one-third portion area 601. On the other hand, the document image 600 in FIG. 6A and the document image 610 in FIG. 6B do not resemble a document image 620 in FIG. 6C in the upper one-third portion area 601. The similarity referred to here means that the structures of the document images match with each other, but the contents of the character strings described therein (for example, company names and the like) do not need to match with each other. The reason is that in the case where the matching of the contents of the character strings is required, the application range of the scan assist function is extremely limited and that in the case where the structures of the document images match with each other, it is considered that the possibility that the same setting rule is applied is high even though the character strings described within the documents are different. In FIG. 6A to FIG. 6C, in the upper one-third portion area 601, information useful for generation of scan assist information, such as the company name and the document title, is described. For such a portion where information useful for generation of scan assist information, it is desirable to set a heavy weight in calculation of degree of similarity. On the other hand, between the document image 600 in FIG. 6A and the document image 620 in FIG. 6C, lower two-thirds portion areas 602 resemble each other, but in these portions, only information, such as the item name and the amount of money, is described and the portions extend or contract depending on the number of items and the like. In fact, between the document image 600 and the document image 610, which resemble each other in the upper one-third portion area 601, the degree of similarity between the lower two-thirds portion areas 602 is not high. That is, in the example in FIG. 6A to FIG. 6C, information described in the lower two-thirds portion areas 602 is not useful for generation of scan assist information, and therefore, it is desirable to set a light weight in calculation of degree of similarity. In summary of the above, in the example in FIG. 6A to FIG. 6C, it is desirable to calculate the degree of similarity so that the degree of similarity between the document image 600 and the document image 610 becomes high as a whole of the image and the degree of similarity between the document images 600 and 610 and the document image 620 becomes low as a whole of the image. That is, by regarding the document images as being the same kind of document image in the case where the degree of similarity between the upper portions of the documents is high, it is possible to improve the accuracy of matching processing. As described above, in the case where it is premised that scan assist information is generated, it becomes necessary to perform estimation of degree of similarity in view of that there are a portion to which importance is attached and a portion to which importance is not attached in documents. Further, there are a variety of formats for the estimation sheet and the like, and therefore, the portion to which importance is attached changes depending on the kind of document (importance is attached to the upper portion or to the lower portion). The above is the basic way of thinking of the estimation of degree of similarity in the matching processing. With the above in mind, details of the matching processing according to the present embodiment are explained with reference to the flowchart shown in FIG. 7.

First, at step 701, the results of the text block extraction processing for the query image, which is performed at step 202, are acquired from the RAM 113. At step 702 that follows, the preprocessing is performed for the extracted text block. Specifically, processing to remove a text block of a short character string, which is meaningless as a character string (removal of noise block), and sort processing to rearrange text blocks from top to bottom along the vertical direction are performed.

In the case where the preprocessing is completed, at step 703, information on one registered image on which attention is focused (registered image of interest) is selected and read from the registered image group stored in the registered image DB. In this information, information on a text block in the registered image of interest and information relating to scan assist information in association with the registered image of interest (information indicating for what OCR processing results are made use of) are included. The information on the registered image itself does not necessarily need to be included. Then, at step 704, the estimation processing of amount of shift between the query image and the registered image of interest is performed. Further, at step 705, the estimation processing of degree of similarity between the query image and the registered image of interest is performed. Details of the amount of shift estimation processing and the degree of similarity estimation processing will be described later.

At step 706, whether there is an unprocessed registered image in the registered image group stored in the registered image DB is determined. In the case where there is an unprocessed registered image, the processing returns to step 703, and the next registered image of interest is selected and the processing is continued. On the other hand, in the case where the estimation processing of degree of similarity with the query image is completed for all the registered images, the processing advances to step 707.

At step 707, from all the registered images for which the estimation of degree of similarity has been performed, the registered image having the highest degree of similarity is determined as a candidate image whose possibility of matching with the query image is strong (hereinafter, matching candidate image). At step 708 that follows, the setting rule described previously for the determined matching candidate image is acquired from the registered image DB.

Lastly, at step 709, information (hereinafter, block correspondence information) indicating the text block group in the query image, which corresponds to the text block group made use of for creation of the file name and the like in the matching candidate image, is generated. It is possible to implement generation of the block correspondence information by performing the same processing as the determination of a pair of blocks (step 802) in the amount of shift estimation processing, to be described later, for the text block of the query image for each text block of the matching candidate image. However, step 802, to be described later, differs from this step in that the text block of the registered image, which corresponds to the text block of the query image, is found at step 802, but the text block of the query image, which corresponds to the text block of the registered image, is found at this step. The generated block correspondence information is stored in the RAM 113 together with the setting rule of the matching candidate image.

The above is the contents of the matching processing.

(Amount of Shift Estimation Processing)

Figure 8:
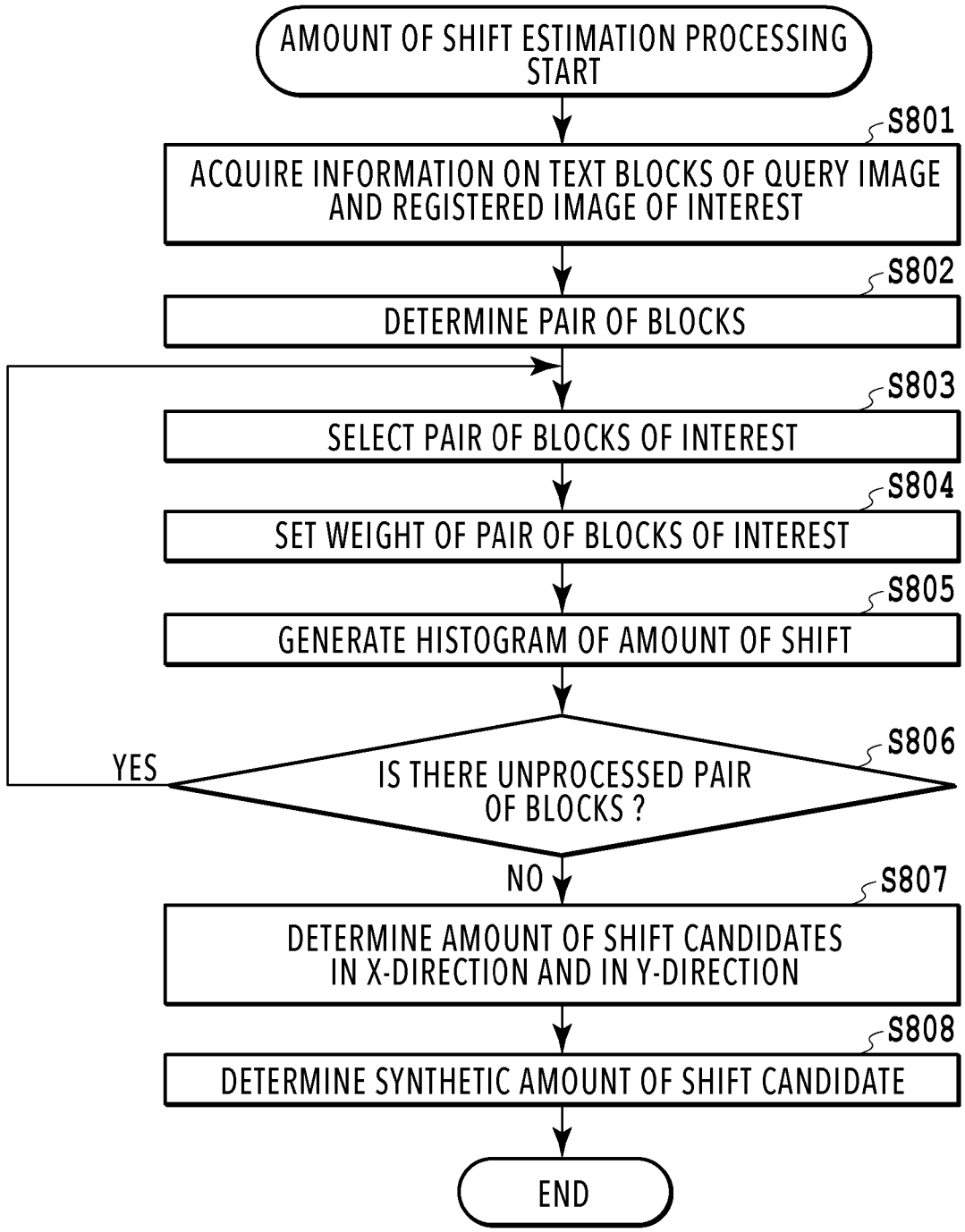
FIG. 8 is a flowchart showing a flow of amount of shift estimation processing.

Following the above, details of the amount of shift estimation processing at step 704 described above are explained. FIG. 8 is a flowchart showing a flow of the amount of shift estimation processing. The method of estimation of amount of shift introduced here is an example and another method may be used. In the following, explanation is given along the flow in FIG. 8.

Figure 9:
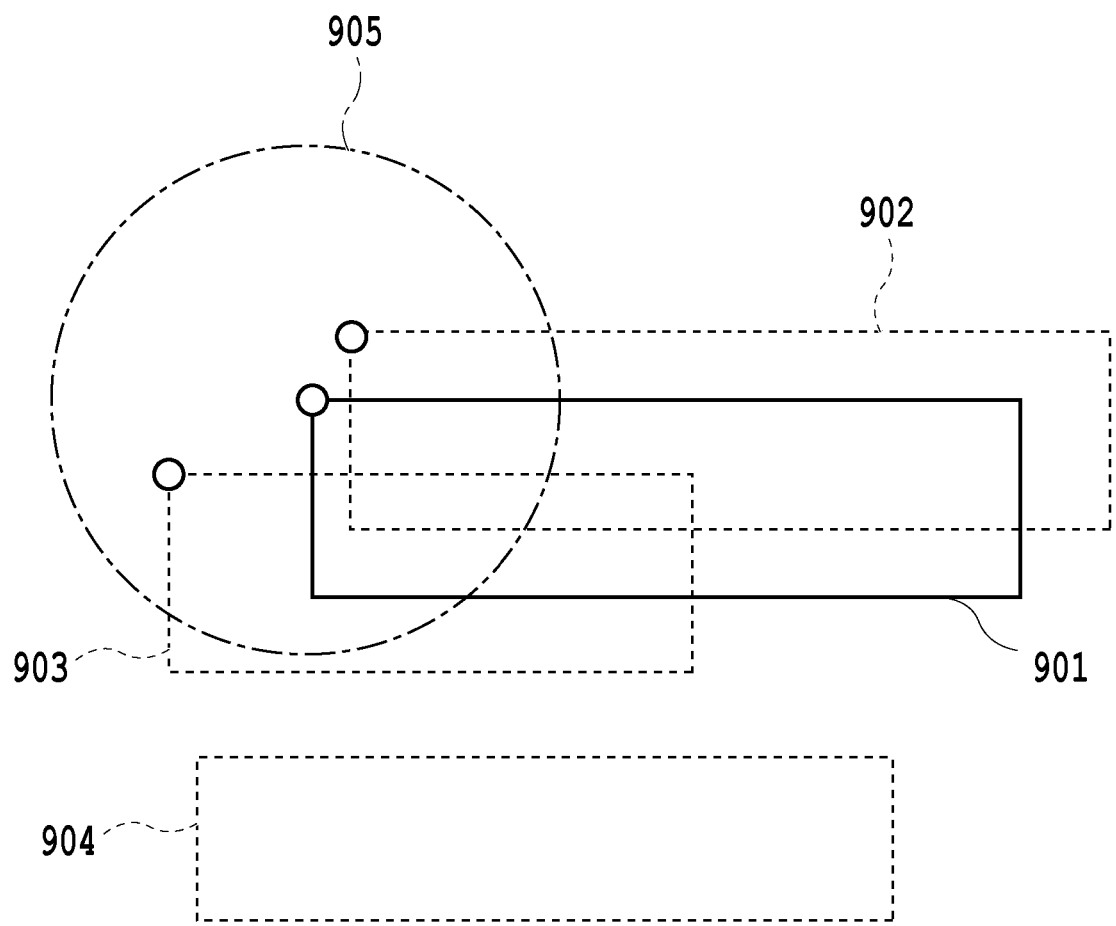
FIG. 9 is a diagram explaining a determination method of a pair of blocks.

First, at step 801, information on the text block in the query image and the text block in the registered image of interest selected at step 703 is acquired from the RAM 113. At step 802 that follows, a pair of blocks in the correspondence relationship between the text block in the query image and the text block in the registered image of interest is determined. Here, the determination method of a pair of blocks is explained by using FIG. 9. FIG. 9 is a diagram obtained by cutting out a portion of a drawing in which the text block in the query image and the text block in the registered image are drawn in the same coordinate system. In FIG. 9, a solid-line rectangle 901 indicate the text block of the query image and broken-line rectangles 902, 903, and 904 indicate the text block group of the registered image located around the text block 901 of the query image. Further, in FIG. 9, a one-dot chain line circle 905 indicates a range with the top-left vertex of the text block 901 of the query image being taken to be the center and a predetermined distance to be the radius. First, in order to determine a pair of blocks, the text block of the registered image, whose top-left vertex is located within the circle 905, is searched for. In the example in FIG. 9, the text blocks 902 and 903 correspond to this. Next, an overlap ratio between the text block 901 of the query image and the text block 902 of the registered image, whose top-left vertex is located within the circle 905, and an overlap ratio between the text block 901 and the text block 903, whose top-left vertex is located within the circle 905, are found, respectively. The overlap ratio is found as follows. First, the top-left vertex of the text block of the query image and that of the text block of the registered image are placed at the same position and the area of the common portion of both the text blocks is calculated. Then, a value obtained by dividing the area of the common portion by the area of the text block whose area is larger of both the text blocks is taken to be the overlap ratio. In this manner, the overlap ratio of the text block of the query image and each text block of the registered image is found and a combination of the text blocks whose overlap ratio is larger than or equal to a predetermined condition is taken to be a pair of blocks. As the predetermined condition at this time, it may be possible to set, for example, a condition that a value larger than or equal to a value obtained by multiplying the maximum overlap ratio by a coefficient α is possessed and an overlap ratio higher than or equal to a predetermined threshold value is possessed. In this case, the coefficient α is a coefficient to obtain a combination having an overlap ratio close to the maximum overlap ratio and a value less than 1.0, for example, a value between 0.5 and 0.8 is used. Further, the predetermined threshold value is a value that specifies the bottom line that guarantees being a pair of blocks and a value less than 1.0, for example, a value between 0.3 and 0.7 is used. The above-described processing is performed for all the text blocks of the query image and a group of pairs of blocks is obtained.

At step 803, from the group of pairs of blocks determined at step 802, one pair of blocks on which attention is focused is selected. Then, at step 804, a weight for the pair of blocks of interest is set. The setting of a weight is based on the overlap state in the pair of blocks of interest and the position (coordinate in the vertical direction) of the pair of blocks of interest. First, the setting of a weight based on the overlap state is explained. At this time, in the case where the text block of the query image in the pair of blocks of interest does not make a pair with the text block of another registered image, the setting is performed so that the weight becomes heavy. Similarly, in the case where the text block of the registered image in the pair of blocks of interest does not make a pair with the text block of another query image, the setting is performed so that the weight becomes heavy. Specifically, for example, a table (hereinafter, weight table) as shown in FIG. 10 is prepared in advance and the setting is performed by making use of this. In the weight table shown in FIG. 10, the horizontal axis represents the number of pairs made by the text block of the query image with the text block of another registered image in the pair of blocks of interest. Further, the vertical axis represents the number of pairs made by the text block of the registered image with the text block of another query image in the pair of blocks of interest. Then, the smaller the number of pairs made by the other text block of the pair with another text block, the higher a weight value that is allocated is. Here, the setting method that makes use of a weight table is explained, but it may also be possible to determine a weight by using a calculation expression. In the case where a calculation expression is used, it is possible to find the same weights as those in the above-described table by expression (1) below on a condition that the weight to be found is taken to be W.

$$W = (1/(N+1) + 1/(M+1))/2 \qquad \text{expression (1)}$$

In expression (1) described above, N indicates the number of pairs made by the text block of the query image with the text block of another registered image in the pair of blocks of interest. Further, M indicates the number of pairs made by the text block of the registered image with the text block of another query image in the pair of blocks of interest.

Figure 11:
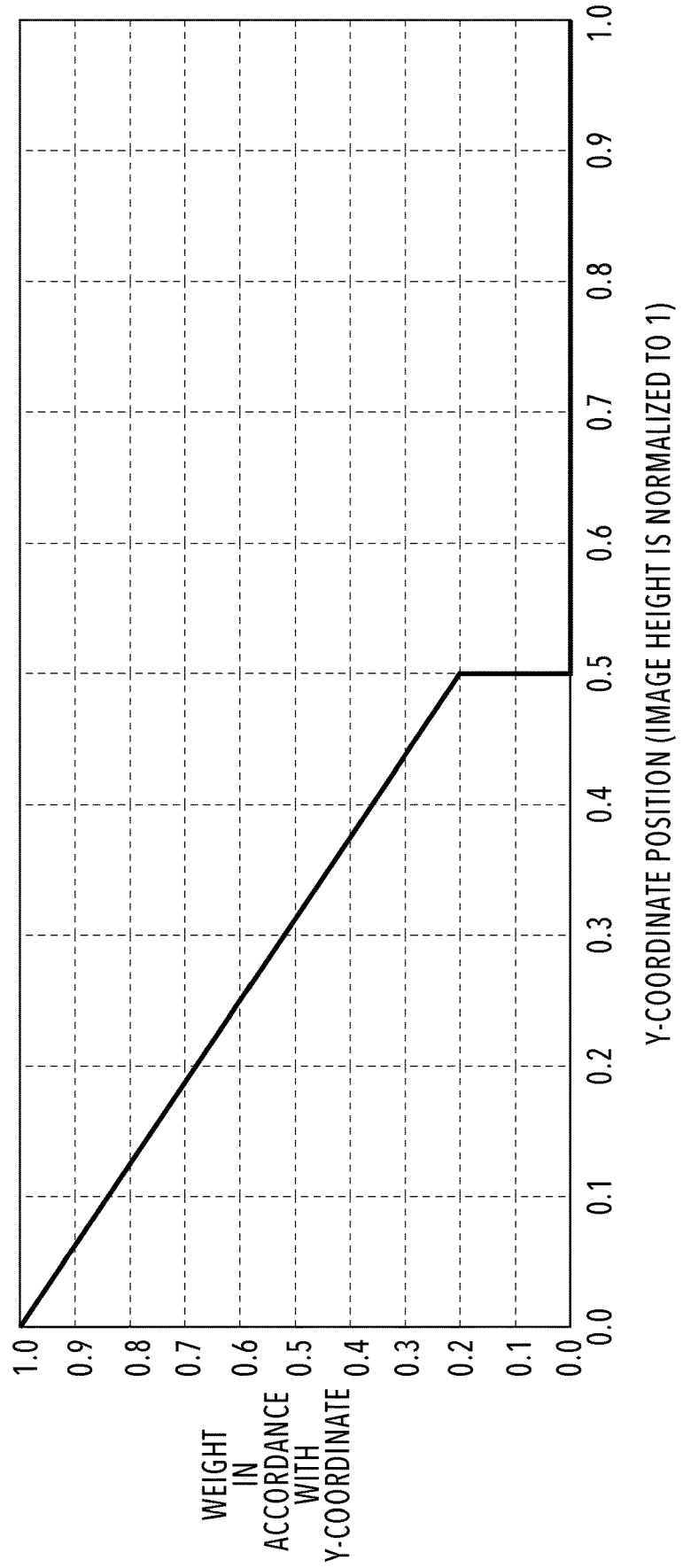
FIG. 11 is a diagram showing an example of a table at the time of setting a weight in accordance with the position of a pair of blocks.

Next, the setting of a weight based on the position (coordinate in the vertical direction) of a pair of blocks is explained. In this case, the setting is performed so that a different weight is set in accordance with the Y-coordinate (in the vertical direction of a document image) of the top-left vertex of the text block of the query image in the pair of blocks of interest. For example, in the case of the document that uses the format in which information useful for scan assist information is described at the upper portion of the document, as in the specific example in FIG. 6A to FIG. 6C described previously, the setting is performed so that a heavier weight is set as the Y-coordinate indicates a higher position of the upper portion of the document. FIG. 11 shows an example of an LUT (Look Up Table) that is used at the time of determining a weight in accordance with the position (Y-coordinate) of a pair of blocks. As in this LUT, it may also be possible to set the weight value of a position at a predetermined or lower position to "0". The reason a weight is set based on the position of a pair of blocks is that it can be said that the position within a document, where the possibility that information made use of for generation of scan assist information is included is strong, is also useful for positioning. In the case where both the setting of a weight based on the overlap state of a pair of blocks and the setting of a weight based on the position (Y-coordinate) of a pair of blocks are made use of, it may be possible to determine a final weight by performing multiplication of the weight values obtained by both the methods, and the like.

At step 805, a histogram of amount of shift that is used in amount of shift candidate determination processing at step 807, to be described later, is generated. Specifically, first, an amount of difference (amount of shift) in the X-direction and an amount of difference (amount of shift) in the Y-direction of the top-left vertex in the pair of blocks of interest are found. Then, the weight set at step 804 is used for the obtained amount of shift and the amount of shift to which the weight is applied is voted in the histogram of amount of shift. The range of the bin of the histogram at this time is arbitrary.

Figures 12A, 12B:
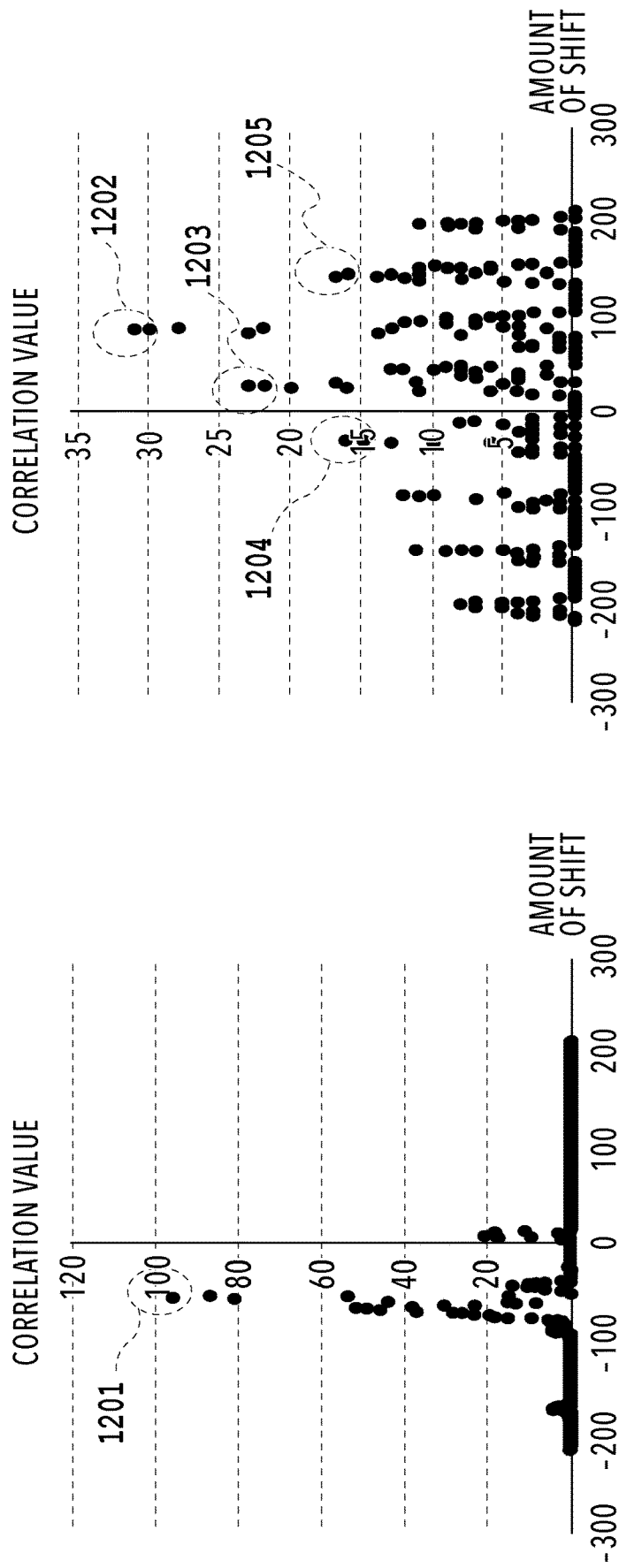
FIG. 12A and FIG. 12B are diagrams each showing an example of a histogram of amount of shift.

At step 806, whether all the pairs of blocks have been processed is determined. In the case where there is an unprocessed pair of blocks, the processing returns to step 803, and the next pair of blocks of interest is selected and the processing is continued. On the other hand, in the case where all the pairs of blocks have been processed, the processing advance to step 807. In the stage where the advancement to step 807 is determined, it is meant that the histograms of amount of shift in the X-direction and in the Y-direction are completed. FIG. 12A and FIG. 12B show examples of a histogram of amount of shift. The horizontal axis represents the amount of shift and the vertical axis represents the correlation value (frequency of histogram). FIG. 12A is a histogram of amount of shift of type in which only one data point 1201 exists as a large peak and FIG. 12B is a histogram of amount of shift of type in which in addition to a data point 1202, which is the maximum peak point, local peak points 1203 to 1205 exist. In the case where there is a concern of influence of noise, it may also be possible to apply smoothing to the generated histogram of amount of shift.

At step 807, the generated histogram of amount of shift is analyzed and an amount of shift candidate between the query image and the registered image of interest is determined for each of the X-direction and the Y-direction. For example, in the case of the histogram of amount of shift in FIG. 12A described above, the data point 1201 exists alone as a large peak, and therefore, the amount of shift corresponding to the data point 1201 is determined as an amount of shift candidate. Further, in the case of the histogram of amount of shift in FIG. 12B described above, all peak points that satisfy a predetermined condition are determined as an amount of shift candidate. The predetermined condition at this time is, for example, that a predetermined ratio (for example, 70%) of the maximum peak point is exceeded, that a predetermined threshold value (for example, correlation value: 15) is exceeded, that the peak point is, for example, the fifth highest peak point from the highest peak point or a higher peak point, and so on. Depending on a condition, for example, the amounts of shift corresponding to the data points 1203, 1204, and 1205 in FIG. 12B may also be determined as an amount of shift candidate. Then, by performing the processing such as this in the X-direction and in the Y-direction respectively, amount of shift candidates (X_Shift and Y_shift) in the X-direction and in the Y-direction respectively between the query image and the registered image of interest are determined.

Lastly, at step 808, by combining the amount of shift candidates determined in the X-direction and in the Y-direction respectively, a synthetic amount of shift candidate (S_Shift) between the query image and the registered image of interest is determined. For example, it is assumed that there are two X_Shift1 and X_Shift2 as the amount of shift candidate in the X-direction and three Y_Shift1, Y_Shift2, and Y_Shift3 as the amount of shift candidate in the Y-direction. In this case, on a condition that the two amount of shift candidates in the X-direction and the three amount of shift candidates in the Y-direction are combined simply, six (2×3) synthetic amount of shift candidates S_Shift1 to S_Shift6 below are obtained.

$S\_Shift1 = (X\_Shift1, Y\_Shift1)$ $S\_Shift2 = (X\_Shift1, Y\_Shift2)$ $S\_Shift3 = (X\_Shift1, Y\_Shift3)$ $S\_Shift4 = (X\_Shift2, Y\_Shift1)$ $S\_Shift5 = (X\_Shift2, Y\_Shift2)$ $S\_Shift6 = (X\_Shift2, Y\_Shift3)$ However, in degree of similarity estimation processing, to be explained next, arithmetic operation processing for each S_shift becomes necessary, and therefore, in the case where the number of S_shifts is large, the processing load becomes heavy. Consequently, it may also be possible to select only a pair involved with the amount of shift of the maximum peak point in the X-direction and the amount of shift of the maximum peak point in the Y-direction as S_shift. This premises that the possibility is faint that the maximum peak points both in the X-direction and in the Y-direction are incorrect at the same time. Here, it is assumed that the amount of shift of the maximum peak point in the X-direction is X_Shift1 and the amount of shift of the maximum peak point in the Y-direction is Y_Shift1 In this case, the four amount of shift candidates, that is, S_Shift1 to S_Shift4, are enough, and therefore, it is possible to reduce the processing load. It may also be possible to narrow the number of synthetic amount of shift candidates by another method. The information on the synthetic amount of shift candidates S_shift thus determined is stored in the RAM 113.

The above is the contents of the amount of shift estimation processing.

(Degree of Similarity Estimation Processing)

Figure 13:
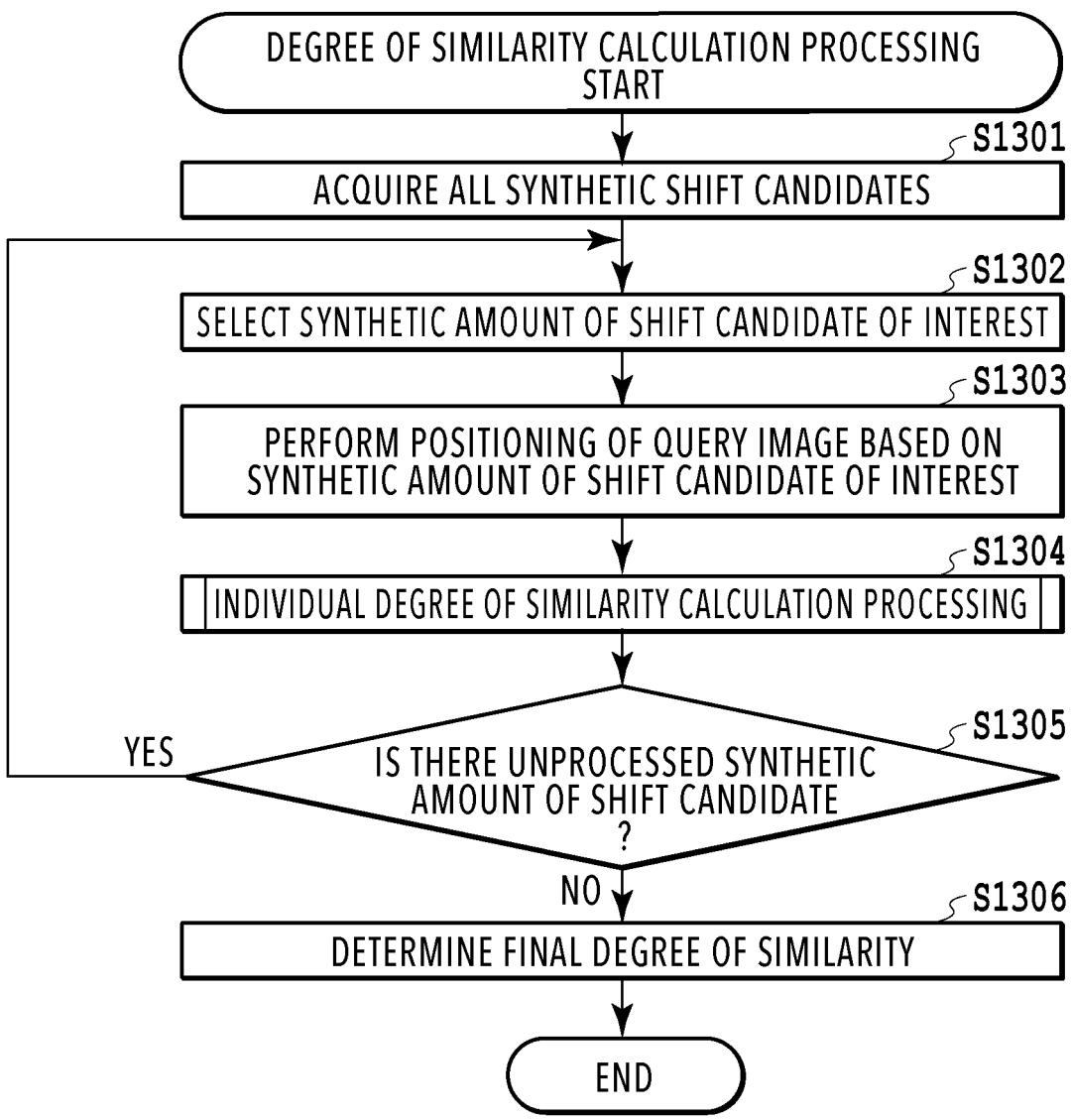
FIG. 13 is a flowchart showing a flow of degree of similarity estimation processing.

Following the above, details of the degree of similarity estimation processing at step 705 described previously is explained. FIG. 13 is a flowchart showing a flow of the degree of similarity estimation processing. The method of estimation of degree of similarity introduced here is an example and another method may be used. In the following, explanation is given along the flow in FIG. 13.

First, at step 1301, information on all the synthetic amount of shift candidates S_shift obtained by the amount of shift estimation processing described above is acquired from the RAM 113. Following the above, from all the acquired synthetic amount of shift candidates S_shift, one synthetic amount of shift candidate S_shiftI (I<total number of synthetic amount of shift candidates) on which attention is focused is selected.

At step 1303, by using the synthetic amount of shift candidate S_shiftI of interest, positioning is performed for the query image. Specifically, processing to uniformly translate the coordinate position of each text block included in the query image at the same time both in the X-direction and in the Y-direction based on S_shiftI is performed. At step 1304 that follows, processing (hereinafter, individual degree of similarity calculation processing) to calculate a degree of similarity between the query image after positioning and the registered image of interest is performed. Details of the individual degree of similarity calculation processing will be described later.

At step 1305, whether the calculation of the individual degree of similarity has been completed for all the synthetic amount of shift candidates S_shift is determined. In the case where there is an unprocessed synthetic amount of shift candidate S_shift, the processing returns to step 1302, and the next synthetic amount of shift candidate S_shiftI of interest is selected and the processing is continued. On the other hand, in the case where the calculation of the individual degree of similarity has been completed for all the synthetic amount of shift candidates S_shift, the processing advances to step 1306.

At step 1306, of the individual degrees of similarity calculated for each synthetic amount of shift candidate S_shift, the highest one is determined to be the final degree of similarity between the query image and the registered image of interest. Further, the synthetic amount of shift candidate S_shift in the case where the highest individual degree of similarity is calculated is taken to be the final synthetic amount of shift corresponding to the final degree of similarity. Information on the final degree of similarity thus determined is stored in the RAM 113 in association with the information on the corresponding synthetic amount of shift, the position information on the text block in the query image after positioning, and the information on the registered image of interest.

By the processing as above, the degree of similarity between the query image and the registered image whose document structure is estimated to be the closest to that of the query image is obtained.

(Individual Degree of Similarity Calculation Processing)

Following the above, the processing to find the individual degree of similarity between the query image after positioning and the registered image of interest at step 1304 described above is explained in detail with reference to the flow in FIG. 14.

First, at step 1401, information on the text block in the query image after positioning and the text block in the registered image of interest is acquired. At step 1402 that follows, the values of a variable S indicating a degree of similarity to be found and a variable Tmp indicating a temporarily degree of similarity in the calculation process thereof are initialized ("0" is set as the initial value).

At step 1403, a text block on which attention is focused is selected from the text blocks included in the query image after positioning. In the present embodiment, a document having a fixed structure in an upper portion area is assumed, and therefore, a text block whose top-left vertex is located at the uppermost portion (in the negative direction of the Y-axis) is selected. The sort processing has been performed at step 702 described previously, and therefore, it is sufficient to select the acquired text blocks in order from top.

At step 1404, a search for a text block in the registered image of interest, which corresponds to the text block of interest of the query image after positioning, is performed. Here, the corresponding text block refers to the text block in the registered image of interest, which overlaps with the text block of interest of the query image, in the case where the text block of interest of the query image after positioning and the text block group of the registered image of interest are drawn in the same coordinate system. In this case, the number of corresponding text blocks is not limited to one and there is a case where a plurality of corresponding text blocks is found. Further, the sort processing has also been performed for the text block in each registered image, and therefore, the search range may be a limited range.

Figure 15A:
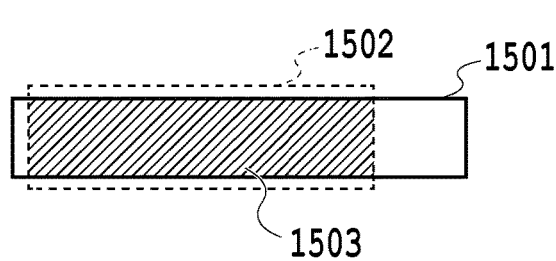
FIG. 15A and FIG. 15B are explanatory diagrams of an overlap area.
Figure 15B:
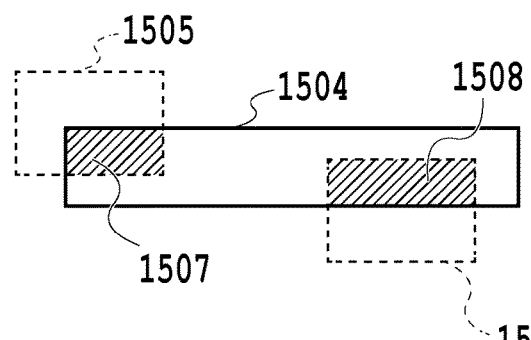

At step 1405, an area is found, in which the text block of the registered image of interest, which has been found by the search, overlaps with the text block of interest of the query image after positioning. In the case of finding the overlap area, the positioning of the text block has already been performed in the query image after positioning, and therefore, the processing to place the top-left vertexes at the same position, which is performed at step 802 described previously, is no longer necessary. FIG. 15A and FIG. 15B are explanatory diagrams of the overlap area. In the example in FIG. 15A, a text block 1501 of the query image after positioning, which is indicated by a solid-line rectangle and a text block 1502 of the registered image, which is indicated by a broken-line rectangle, overlap and the overlap area is the area of a shaded area 1503. Further, in the example in FIG. 15B, a text block 1504 of the query image after positioning, which is indicated by a solid-line rectangle, and two text blocks 1505 and 1506 of the registered image, which are indicated by broken lines, overlap and the overlap area is a total value of two shaded areas 1507 and 1508.

At step 1406, preparation processing to calculate the temporary degree of similarity Tmp is performed. Specifically, three pieces of processing below are performed.

1) Processing to find a total overlap area OverlapArea by adding the overlap area found at step 1405 to an accumulated value of the overlap areas found by routines up to the routine of the previous time 2) Processing to find a total area TotalArea_Q of the already-processed text blocks of the query image 3) Processing to find a total area TotalArea_R of the text blocks of the registered image, which exist higher than the text block existing at the lowest of the already-processed text blocks of the query image In processing 3) described above, as the position of the text block of the query image, the coordinates of the lowermost end thereof are used and as the position of the text block of the registered image, the top-left coordinates thereof are used.

At step 1407, whether the calculation start condition of the temporary degree of similarity Tmp is satisfied is determined. The calculation start condition is a condition to determine whether it is possible to calculate the temporary degree of similarity Tmp that is reliable. In the case where the number of text blocks is small or in the case where the range in which the text block of the already-processed query image exists is narrow, it is considered that the degree of reliability of the temporary degree of similarity Tmp that is obtained is low. Consequently, the calculation start condition is taken to be, for example, as the following contents.

- Whether a predetermined number of (for example, one to three) text blocks has been processed in the query image
- Whether up to the text block a predetermined distance (for example, 10% of the page height) apart from the top end of the page has been processed in the query image
- Whether up to the text block a predetermined distance (for example, 10% of the page height) apart from the text block at the uppermost portion has been processed in the query image
- Whether the total area of the already-processed text blocks of the query image has exceeded a predetermined threshold value The above-described calculation start condition may be used alone or in a combination of a plurality of calculation start conditions. Further, it may also be possible to make use of a plurality of combinations of a plurality of conditions. In the case where the results of the determination indicate that the calculation start condition is not satisfied, the processing advances to step 1411. On the other hand, in the case where the calculation start condition is satisfied, the processing advances to step 1408.

At step 1408, the temporary degree of similarity Tmp is calculated. It is possible to find the temporary degree of similarity Tmp by using expression (2) below, which quantitatively indicates how similar the arrangement and shape of the text block group in the query image and the arrangement and shape of the text block group in the registered image of interest are.

$$\text{temporary degree of similarity } Tmp = \text{OverlapArea}/\text{TotalArea}\_L \quad \text{expression (2)}$$

In expression (2) described above, TotalArea_L indicates TotalArea_Q or TotalArea_R, whose value is larger. In the case where the area of the text block of the query image or the registered image is large, the possibility that document images whose structures do not match with each other overlap becomes strong and OverlapArea becomes large. Because of this, the value of OverlapArea is divided by the value of TotalArea_Q or TotalArea_R, whose value is larger. It is also possible to find the temporary degree of similarity Tmp by, for example, expression (2)' or expression (2)" below.

$$\text{temporary degree of similarity } Tmp = \text{OverlapArea} \times 2/(\text{TotalArea}\_Q + \text{TotalArea}\_R) \quad \text{expression (2)'}$$

$$\text{temporary degree of similarity } Tmp = (\text{OverlapArea}/\text{TotalArea}\_Q) \times (\text{OverlapArea}/\text{TotalArea}\_R) \quad \text{expression (2)"}$$

At step 1409, processing to compare the temporary degree of similarity Tmp found at step 1408 with the current degree of similarity S is performed. In the case where the value of the temporary degree of similarity Tmp is larger, the processing advances to step 1410. On the other hand, in the case where the value of the temporary degree of similarity Tmp is smaller (or equal), the processing advances to step 1411. The history of the temporary degree of similarity Tmp found at step 1408 is stored in the RAM 113 for utilization in correction processing (step 1412), to be described later. Then, at step 1410, the value of the degree of similarity S is updated. Specifically, the value of the degree of similarity S is overwritten by the value of the current temporary degree of similarity Tmp.

At step 1411, whether all the text blocks of the query image after positioning have been processed is determined. In the case where there is an unprocessed text block, the processing returns to step 1403, and the next text block of interest is selected and the processing is continued. On the other hand, in the case where all the text blocks have been processed, the processing advances to step 1412.

At step 1412, correction processing of the degree of similarity S is performed. Before explanation of the correction processing, the meaning of the repetitive calculation of the temporary degree of similarity Tmp in the processing so far is explained. FIG. 16A and FIG. 16B show the way the image range (calculation range) that is the target of the calculation of the temporary degree of similarity Tmp sequentially changes. In FIG. 16A and FIG. 16B, FIG. 16A shows a registered image and FIG. 16B shows a query image and six kinds of bidirectional arrow, that is, bidirectional arrows 1601 to 1606 whose lengths are different, indicate the calculation ranges of the temporary degree of similarity Tmp, respectively. All the calculation ranges include the upper portion area of the document image, and therefore, even in the case where the position of the important header information or the like changes somewhat in accordance with the document contents, it is made possible to deal with the change. The value of the temporary degree of similarity Tmp for each of the calculation ranges 1601 to 1606 is, for example, as follows.

Tmp value of calculation range 1601: 0.60
Tmp value of calculation range 1602: 0.64
Tmp value of calculation range 1603: 0.65
Tmp value of calculation range 1604: 0.75
Tmp value of calculation range 1605: 0.5
Tmp value of calculation range 1606: 0.4

Although an error resulting from an extraction mistake of a text block, variations, a difference in length or size of an extracted text block, and so on may be included, the value of the temporary degree of similarity Tmp is relatively high up to the portion of the calculation range 1604. That is, it can be said that the degree of similarity corresponding to the fixed structure of a document format (in the example in FIG. 16A and FIG. 16B, importance is attached to the upper portion area where important information, such as the document title and the company name, exists) is calculated. In this example, the value of the temporary degree of similarity Tmp of the calculation range 1604 is the maximum value, and therefore, this will be the final degree of similarity S. As described above, by changing the calculation range so as to always include a specific image area (hereinafter, specific area) within a document, it is made possible to calculate the degree of similarity corresponding to the fixed structure of a document format. FIG. 17A and FIG. 17B show another specific example. In FIG. 17A and FIG. 17B, FIG. 17A is a registered image and FIG. 17B is a query image. Both the images match in the general structure, but differ in the portion where item names are written. Because of this, in the case where the calculation range changes slightly, the calculation results will largely differ as follows.

Tmp value of calculation range 1701: 0.75
Tmp value of calculation range 1702: 0.18

As is obvious from FIG. 17A and FIG. 17B, the difference between the calculation range 1701 and the calculation range 1702 is not large. However, there are many text blocks that exist only in the query image in FIG. 17B, and therefore, the value of the temporary degree of similarity Tmp is low. As described above, even in the case where the calculation range differs slightly, the calculation results may differ largely, and therefore, it is known that the accuracy cannot be guaranteed in the case where the degree of similarity is found by taking a fixed range as a target in all document images. In the example in FIG. 17A and FIG. 17B, a lower portion area 1703 also has a fixed structure, and therefore, it may also be possible to take the lower portion area as the specific area within a document, which is always included in the calculation range, in place of the upper portion area. Further, it may also be possible to integrate the calculation results obtained by including the upper portion area and the calculation results obtained by including the lower portion area. At the time of integration, it is possible to obtain the final degree of similarity by taking into consideration how much in total the structure of the upper portion matches with that of the lower portion by correction processing, to be described later. For example, it is assumed that there are a registered image A having a fixed structure that matches with that of the query image only in the upper portion and a registered image B having a fixed structure that matches with that of the query image both in the upper portion and the lower portion. Then, in the case where the structure of the upper portion of the registered image A resembles that of the registered image B, the degree of similarity of the registered image B is made higher than that of the registered image A, and so on.

Lastly, at step 1412, based on the distribution of the temporary degree of similarity Tmp obtained by the repeated calculation, correction processing of the degree of similarity S is performed. The degree of similarity S is the maximum value of those obtained by performing the calculation of the temporary degree of similarity Tmp a plurality of times and cannot reflect the distribution situation of the temporary degree of similarity Tmp. For example, even though the Tmp value is the same, there is a case where the Tmp value is high only in the vicinity of the S value and there is a case where the Tmp value is high in a wider range including the S value. Then, in the case of the latter, it is desirable to correct the S value in accordance with the distribution situation of the Tmp value. FIG. 18A to FIG. 18C show a specific example thereof. In FIG. 18A to FIG. 18C, FIG. 18A is a query image and FIG. 18B and FIG. 18C are registered images whose degrees of similarity S with the query image in FIG. 18A are 0.8. The registered image in FIG. 18B has the same structure as that of the query image in FIG. 18A as a whole and only the portions where item names are described are different. On the other hand, in the registered image in FIG. 18C, only the structure of the upper portion is the same as that of the query image in FIG. 18A and the structure of the lower portion is different. In the case such as this, it is desirable for the degree of similarity S of FIG. 18B resembling FIG. 18A as a whole to be higher than the degree of similarity S of FIG. 18C. Here, in the registered image in FIG. 18B, it is assumed that the temporary degree of similarity Tmp exceeds 0.7 in a range (ratio of the range to the entire page: 25%) indicated by a bidirectional arrow 1801. Further, in the registered image in FIG. 18C, it is assumed that the temporary degree of similarity Tmp exceeds 0.7 in a range (ratio of the range to the entire page: 15%) indicated by a bidirectional arrow 1802. In this case, the degree of similarity S is corrected by using, for example, expression (3) below.

> degree of similarity S after correction=MIN(1,degree of similarity S×predetermined gain×MAX(ratio of range in which temporary degree of similarity Tmp is higher than or equal to predetermined threshold value/predetermined normalization coefficient−1,0)+degree of similarity S)

In expression (3) described above, MIN (A, B) is a function that outputs the value of A or B, which is smaller, and MAX (A, B) is a function that outputs the value of A or B, which is larger. The predetermined gain is a value that defines the intensity of correction and is, for example a value of about 0.05 to 0.5. The predetermined normalization coefficient is a value that determines whether to correct the degree of similarity S in the case where the ratio of the range in which the temporary degree of similarity Tmp is higher than or equal to a predetermined threshold value reaches the value and is, for example, a value of about 0.05 to 0.2. In the example in FIG. 18A to FIG. 18C, in the case where it is assumed that the predetermined threshold value is 0.7 and both the predetermined gain and the normalization coefficient are 0.1, the degrees of similarity S after correction will be as follows, respectively.

in the case of the registered image in FIG. 18B

> degree of similarity S after correction=MIN(0.8×0.1× MAX(0.25/0.1−1,0)+0.8=0.92 in the case of the registered image in FIG. 18C

> degree of similarity S after correction=MIN(0.8×0.1× MAX(0.15/0.1−1,0)+0.8=0.84

As described above, in the case where the ratio of the range in which the temporary degree of similarity Tmp is higher than or equal to the predetermined threshold value is larger than the predetermined normalization coefficient, the value of the degree of similarity S after correction becomes large. Conversely, in the case where the ratio is smaller than the normalization coefficient, the value of the degree of similarity S after correction becomes small. Further, the larger the ratio of the range in which the temporary degree of similarity Tmp is higher than or equal to the predetermined threshold value, the larger the value of the degree of similarity S after correction becomes. In the example in FIG. 18A to FIG. 18C also, the value of the degree of similarity S after correction of the registered image in FIG. 18B, whose ratio of the range in which the value of the temporary degree of similarity Tmp is larger than or equal to 0.7 is 25%, is larger than that of the registered image in FIG. 18C, whose ratio of the range in which the value of the temporary degree of similarity Tmp is larger than or equal to 0.7 is 15%. The correction method is not limited to the method that uses expression (3) described above. For example, it may also be possible to estimate the width of the area that is similar between the query image and the registered image by the average of a higher half of the temporary degrees of similarity Tmp, and the like, and to perform correction so that the wider the estimated width, the larger the value of the degree of similarity S becomes.

The above is the contents of the individual degree of similarity calculation processing. By this, the degree of similarity between the query image after positioning and the registered image of interest is obtained.

In the individual degree of similarity calculation processing of the present embodiment, the text block is made use of, but this is not limited. For example, it may also be possible to find the degree of similarity by comparing the appearances themselves of document images by making use of the pixel values of the document images whose resolutions are reduced by performing resolution conversion, specifically, by making use of the sum of the absolute values of difference in the luminance value or the correlation coefficient. Alternatively, it may also be possible to find the degree of similarity by comparing the contents themselves described in documents by making use of character string information obtained by OCR processing, specifically, by making use of the Levenshtein distance, which is a measure for calculating the distance between obtained character strings, and the like.

Further, in the matching processing of the present embodiment, the document image itself is used as the registered image, but this is not limited. For example, any feature amount may be used as long as the feature amount can be made use of for matching processing, such as text block extraction processing results of each document image.

As above, according to the present embodiment, it is made possible to calculate a degree of similarity between document images in the state where a specific area (fixed structure portion) important at the time of identifying whether the document images are of the same kind is included, but an area (portion where there is a difference although the document images are of the same kind) that is not important for identification is not included. Due to this, it is possible to search for a document of the same kind as that of a document relating to a scanned image with a high accuracy, and therefore, it is also possible to improve accuracy of scan assist information presented to a user. Further, it is not necessary for a user to specify a specific area one by one, and therefore, it is also possible to reduce the load of a user.

Second Embodiment

Figure 19:
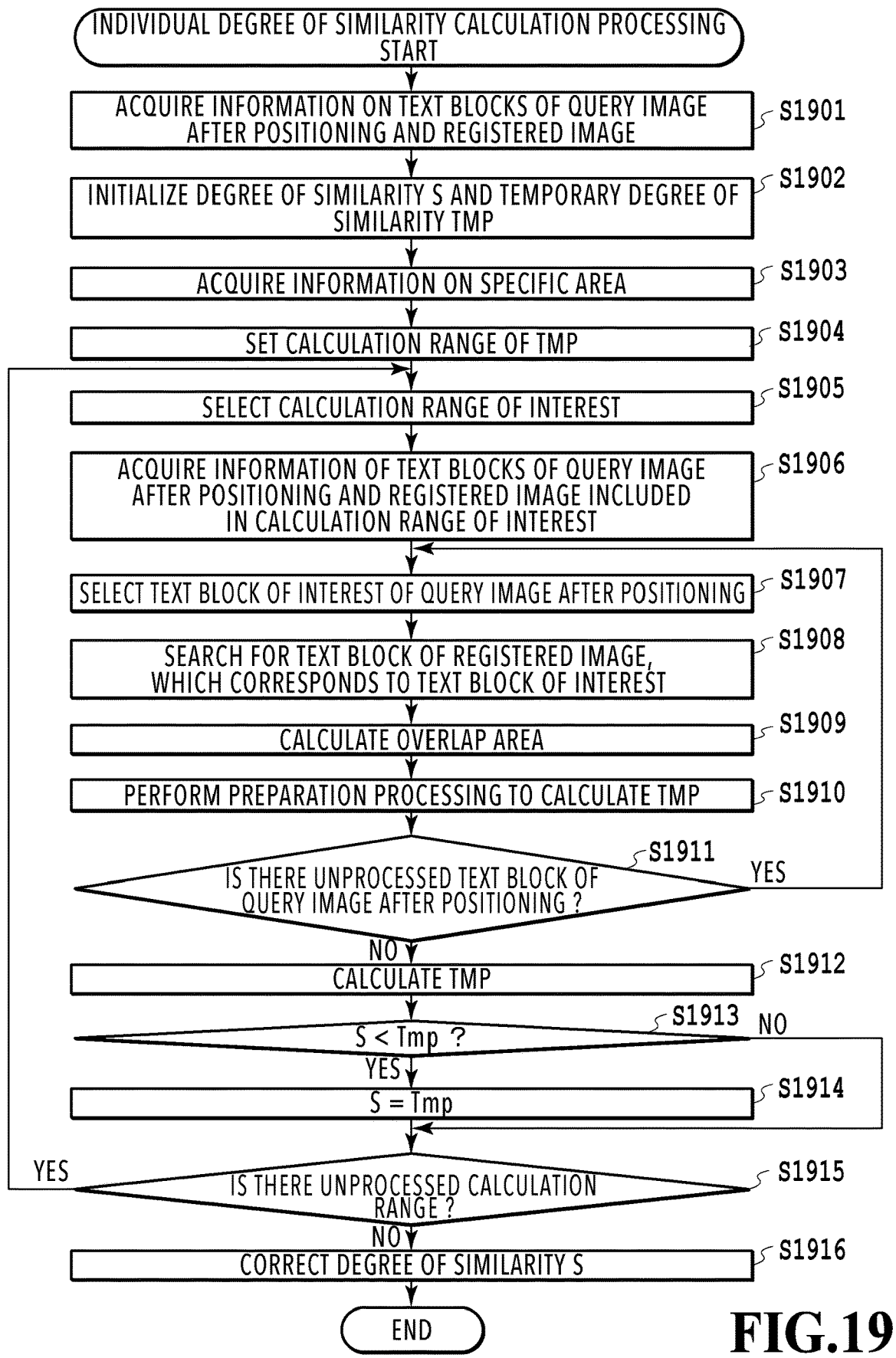
FIG. 19 is a flowchart showing a flow of processing to find an individual degree of similarity according to a second embodiment.

Next, an aspect is explained as a second embodiment, in which it is made possible to flexibly change the calculation range of the temporary degree of similarity Tmp. The contents other than individual degree of similarity calculation processing are the same as those of the first embodiment. In the following, with reference to a flow in FIG. 19, which corresponds to the flow in FIG. 14 described previously, the individual degree of similarity calculation processing in the present embodiment is explained.

Figure 14:
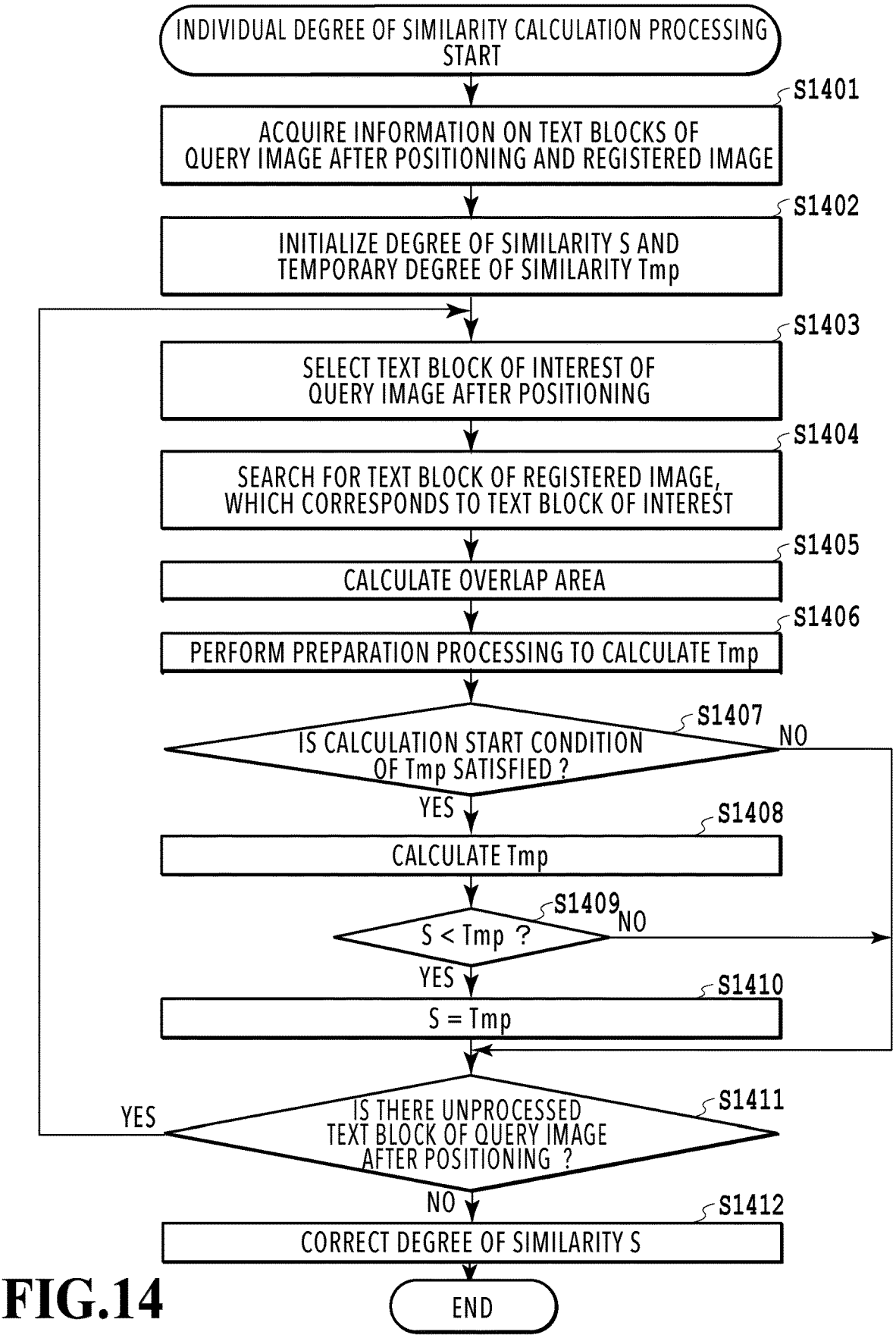
FIG. 14 is a flowchart showing a flow of processing to find an individual degree of similarity according to a first embodiment.

Step 1901 and step 1902 correspond to step 1401 and step 1402 in the flow in FIG. 14, respectively. That is, in the case where information on text blocks of a query image after positioning and a registered image of interest is acquired (step 1901), the values of the variable S indicating a degree of similarity and the variable Tmp indicating a temporary degree of similarity are initialized (step 1902).

At step 1903, information on a specific area that is always included in the calculation range of the temporary degree of similarity Tmp is acquired. As information on a specific area, for example, there is such information as follows:
  information on the position, such as the upper portion area and the lower portion area of a document image, determined in advance by an application and the like
  information on the position of an area that is set in accordance with contents (for example, importance is attached to the upper portion, importance is attached to the lower portion, and so on, with the query image side being taken as a reference) specified by a user via the UI (User Interface) of the operation unit 120
  information on the position of a predetermined area registered in association with the registered image and including the text block made use of for generation of scan assist information.

Here, a specific example of a predetermined area registered in association with a registered image is explained by using FIG. 20A and FIG. 20B. In FIG. 20A and FIG. 20B, for a common registered image, areas in various shapes are associated as specific areas. First, FIG. 20A is an example of specific areas in the case where text blocks 2001, 2002, and 2003 indicated by broken lines are made use of for generation of scan assist information. In FIG. 20A, Y-coordinates (vertical direction) of a specific area 2004 indicated by a one-dot chain line are the top side of the text block 2001 and the bottom side of the text block 2003 and X-coordinates (horizontal direction) thereof are the left end and the right end of the document image. In the document image, the portion where a fixed structure and a non-fixed structure switch is located in the vertical direction in many cases, and it is not frequent that they switch in the horizontal direction, and therefore, in the horizontal direction, it is considered that the left end and the right end of the specific area are taken as the those of the document image as described above. However, the specific area may be one such as a specific area 2005 indicated by a two-dot chain line, whose X-coordinates (horizontal direction) are the leftmost end and the rightmost end of the text blocks 2001 to 2003. FIG. 20B is an example of specific areas in the case where the text blocks 2001 and 2002 and a text block 2006 indicated by broken lines are made use of for generation of scan assist information. In FIG. 20B, Y-coordinates (vertical direction) of a specific area 2007 indicated by a one-dot chain line are the top side of the text block 2001 and the bottom side of the text block 2006 and X-coordinates (horizontal direction) are the left end and the right end of the document image. In the case of the specific area 2007, the text block 2002 and the text block 2006 are largely apart from each other, and therefore, many text blocks not important for generation of scan assist information are included. Consequently, in the case where text blocks made use of for generation of scan assist information are largely apart from each other, it may also be possible to group the text blocks and divide the specific area into two specific areas, such as specific areas 2008 and 2009 indicated by two-dot chain lines. In this case, Y-coordinates of the specific area 2009 are the top end and the bottom end of the text block 2006, to which a margin is attached, respectively. The reason is that the text block 2006 forms one area by itself, and therefore, unless a margin is attached, a stable specific area is not obtained because the height of the area is too narrow. By dynamically acquiring the information on the specific area as above, it is made possible to deal with document images including various structures, compared to the first embodiment.

At step 1904, based on the information on the specific area acquired at step 1903, a plurality of degree of similarity calculation ranges is set. The degree of similarity calculation range in this case only needs to include a specific area and may have any shape. For example, in the case of the specific area 2004 or 2007, the area is taken to be a reference calculation range and the calculation range is extended by a predetermined width (for example, 1% of page) each time in the Y-direction (vertical direction), and thus a plurality of calculation ranges is set. Further, in the case of the specific area 2005, the area is taken to be a reference calculation range and the calculation range is extended by a predetermined width each time in the X-direction (horizontal direction) and in the Y-direction (vertical direction), respectively, and thus a plurality of calculation ranges is set. At this time, calculation ranges that combine the calculation range extended only in the X-direction, the calculation range extended only in the Y-direction, and the calculation range extended both in the X-direction and in the Y-direction at the same time are set. Further, in the case where there are two specific areas, such as the case of the specific areas 2008 and 2009, both the areas are taken to be reference calculation ranges, and for each of the areas, the calculation range is extended by a predetermined width each time and thus a plurality of calculation ranges is set. That is, a plurality of calculation ranges is set by taking into consideration the extension in the Y-direction based on the specific area 2008, the extension in the Y-direction based on the specific area 2009, and the simultaneous extension of both the areas.

At step 1905, one calculation range on which attention is focused is selected from a plurality of set calculation ranges. Then, at step 1906, information on the text block of the query image after positioning and the text block of the registered image of interest, which are included in the selected calculation range of interest, is acquired. Further, at step 1907, as in the case with step 1403 of the flow in FIG. 14, from the text blocks in the query image after positioning, a text block on which attention is focused is determined. Each piece of processing at step 1908 to step 1910 corresponds to that at step 1404 to step 1406 in the flow in FIG. 14, respectively. That is, a search for a text block of the registered image of interest, which corresponds to the text block of interest of the query image after positioning (step 1908), calculation of an overlap area (step 1909), and preparation processing for calculating the temporary degree of similarity Tmp (step 1910) are performed.

At step 1911, whether all the text blocks of the query image after positioning have been processed is determined. In the case where there is an unprocessed text block, the processing returns to step 1907, and the next text block of interest is determined and the processing is continued. On the other hand, in the case where all the text blocks have been processed, the processing advances to step 1912.

Each piece of processing at step 1912 to step 1914 corresponds to that at step 1408 to step 1410 in the flow in FIG. 14, respectively. That is, calculation of the temporary degree of similarity Tmp (step 1912), comparison processing between the calculated temporary degree of similarity Tmp and the current degree of similarity S (step 1913), and updating of the value of the degree of similarity S (step 1914) are performed. In the calculation of the temporary degree of similarity Tmp, the definition of QueryArea is the total area of the text blocks of the query image included in the degree of similarity calculation range. Similarly, the definition of RegistArea is the total area of the text blocks of the registered image included in the degree of similarity calculation range.

At step 1914, whether the calculation of the temporary degree of similarity Tmp has been completed for all the calculation ranges set at step 1904 is determined. In the case where there is an unprocessed calculation range, the processing returns to step 1905, and the next calculation range of interest is determined and the processing is continued. On the other hand, in the case where the calculation of the temporary degree of similarity Tmp has been completed for all the calculation ranges, the processing advances to step 1915.

Lastly, at step 1915, as in the case with step 1412 of the flow in FIG. 14, correction processing of the degree of similarity S based on the distribution of the temporary degree of similarity Tmp is performed. The above is the contents of the degree of similarity calculation processing according to the present embodiment.

According to the present embodiment, it is possible to flexibly change the reference position (upper portion or lower portion) at step 1403 of the flow in FIG. 14 of the first embodiment, and therefore, it is made possible to deal with more kinds of document image. Further, in the case of the present embodiment, it is also possible for a user to specify a specific area, and therefore, it is possible to apply the present embodiment to a business form having a special format, and the like. Furthermore, it is also possible to determine a specific area based on the text block actually made use of for generation of scan assist information in the registered image, and in this case, switching of specific areas is performed for each registered image. The text block made use of for switching at this time is one having actually been made use of for generation of scan assist information, and therefore, it is expected that the calculation range that is set is more appropriate for calculation of a degree of similarity. Because of this, this leads to improvement of accuracy of degree of similarity calculation processing

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to search for a document of the same kind as that of a document relating to a scanned image both highly accurately and simply.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181695 filed Sep. 21, 2017, which is hereby incorporated by reference wherein in its entirety.

What is claimed is:

1. An image processing apparatus comprising:
a processor; and
a memory for storing a computer executable program, wherein the processor executes the computer executable program to perform:
extracting at least one block having a text attribute by performing area division processing for the input document image;
calculating a degree of similarity between the input document image and each of a plurality of document images by repeatedly performing calculation of the degree of similarity based on a shape and arrangement of the extracted at least one blocks included in each of a plurality of different ranges, which are calculation targets, with respect to the input document image and each of the plurality of document images; and
determining a document image whose calculated degree of similarity is the highest of the plurality of document images as a document image that matches with the input document image.

2. The image processing apparatus according to claim 1, wherein
each of the plurality of different ranges includes a specific area having a fixed structure in the format of the input document image and the plurality of document images.

3. The image processing apparatus according to claim 1, wherein
the processor further executes a computer executable program to perform estimating of an amount of shift between the input document image and each of the plurality of document images by acquiring information on a pair of blocks, which indicates a correspondence relationship between the at least one block having the text attribute in the input document image and at least one block having the text attribute in each of the plurality of document images, and based on the acquired information on a pair of blocks, and wherein in calculating the degree of similarity, the processor executes the computer executable program to perform:
    positioning of the at least one block having the text attribute included in the input document image in accordance with the estimated amount of shift; and
    calculation of the degree of similarity based on a shape and arrangement of the at least one block having the text attribute after the positioning.

4. The image processing apparatus according to claim 3, wherein
    the estimating sets a weight to each of the pair of blocks, generates a histogram of an amount of shift in each of pairs of blocks by using the weight, and estimates a final amount of shift between the input document image and each of the plurality of document images based on the histogram.

5. The image processing apparatus according to claim 4, wherein
    the setting of the weight is performed based on an overlap state in each of the pairs of blocks or a position of each of the pairs of blocks.

6. The image processing apparatus according to claim 5, wherein
    in the setting of the weight based on the overlap state in each of the pairs of blocks, the smaller a number of pairs made by the other block having a text attribute of the pair with another block having a text attribute, the higher a weight value that is set is.

7. The image processing apparatus according to claim 5, wherein
    in the setting of the weight based on the position of each of the pairs of blocks, for a pair of blocks included in the specific area, a weight value higher than that of a pair of blocks not included in the specific area is set.

8. The image processing apparatus according to claim 7, wherein
    the position of each of the pairs of blocks is specified by coordinates in a vertical direction in a document image and a different weight value is set in accordance with the coordinates.

9. The image processing apparatus according to claim 1, wherein
    the processor further executes a computer executable program to perform registering of the input document image as the plurality of document images.

10. The image processing apparatus according to claim 1, wherein
    the plurality of document images is registered in advance as image data including position information on a text block within each document image, and
    the degree of similarity of the plurality of document images is calculated by using the position information on a text block, which is registered in advance.

11. The image processing apparatus according to claim 1, wherein, in the calculating, the degree of similarity between the input document image and each of a plurality of document images is calculated by comparing the shape and arrangement of the extracted at least one blocks included in each of the plurality of different ranges of the input document image with a shape and arrangement of blocks included in each of the plurality of different ranges of each of the plurality of document images, and
    wherein, the degree of similarity is calculated without using a content of a character strings described in the extracted at least one blocks included each of the plurality of different ranges of the input document image.

12. The image processing apparatus according to claim 1, wherein, in the calculating, the degree of similarity between the input document image and each of a plurality of document images is calculated by correcting the plurality of degrees of similarity obtained by repetition of the calculation in accordance with a distribution of the plurality of degrees of similarity.

13. An image processing apparatus comprising:
    a processor; and
    a memory for storing a computer executable program, wherein
    the processor executes the computer executable program to perform:
        calculating a degree of similarity between the input document image and each of a plurality of document images by repeatedly performing calculation of the degree of similarity for each of a plurality of different ranges, which are calculation targets of the degree of similarity, with respect to the input document image and each of the plurality of document images, wherein at least one of a plurality of degrees of similarity obtained by repetition of the calculation is corrected in accordance with a distribution of the plurality of degrees of similarity, and
        determining a document image whose degree of similarity after the correction is the highest as a document image that matches with the input document image.

14. A method comprising:
    extracting to extract at least one block having a text attribute by performing area division processing for the input document image;
    calculating a degree of similarity between the input document image and each of a plurality of document images by repeatedly performing calculation of the degree of similarity based on a shape and arrangement of the extracted at least one blocks included in each of a plurality of different ranges, which are calculation targets, with respect to the input document image and each of the plurality of document images; and
    determining a document image whose calculated degree of similarity is the highest of the plurality of document images as a document image that matches with the input document image.

15. A non-transitory computer readable storage medium storing a program for causing a computer to perform a method comprising:
    extracting to extract at least one block having a text attribute by performing area division processing for the input document image;
    calculating a degree of similarity between the input document image and each of a plurality of document images by repeatedly performing calculation of the degree of similarity based on a shape and arrangement of the extracted at least one blocks included in each of a plurality of different ranges, which are calculation targets, with respect to the input document image and each of the plurality of document images; and
    determining a document image whose calculated degree of similarity is the highest of the plurality of document images as a document image that matches with the input document image.

* * * * *